United States Patent
Park et al.

(10) Patent No.: US 9,049,490 B2
(45) Date of Patent: Jun. 2, 2015

(54) IMAGE DISPLAY APPARATUS AND CONTROL METHOD THEREOF

(71) Applicant: LG ELECTRONICS INC., Seoul (KR)

(72) Inventors: Junghoon Park, Seoul (KR); Dongwon Choi, Seoul (KR); Sunjung Hwang, Seoul (KR); Cheonhee Lee, Seoul (KR); Namhun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/043,351

(22) Filed: Oct. 1, 2013

(65) Prior Publication Data

US 2014/0282726 A1 Sep. 18, 2014

(30) Foreign Application Priority Data

Mar. 15, 2013 (KR) ........................ 10-2013-0028219

(51) Int. Cl.
- *G06F 3/00* (2006.01)
- *G06F 13/00* (2006.01)
- *H04N 5/445* (2011.01)
- *H04N 21/485* (2011.01)

(52) U.S. Cl.
CPC ................................ *H04N 21/4858* (2013.01)

(58) Field of Classification Search
USPC .......................... 725/37–38, 52, 62, 109–110
See application file for complete search history.

(56) References Cited

U.S. PATENT DOCUMENTS

| | | | |
|---|---|---|---|
| 7,479,949 B2 * | 1/2009 | Jobs et al. | 345/173 |
| 2007/0101364 A1 * | 5/2007 | Morita | 725/38 |
| 2009/0122085 A1 * | 5/2009 | Iijima | 345/660 |
| 2009/0309813 A1 | 12/2009 | Fujita | |
| 2011/0047578 A1 | 2/2011 | Kim et al. | |
| 2011/0258530 A1 * | 10/2011 | Jang | 715/234 |
| 2012/0194429 A1 | 8/2012 | Kwon et al. | |
| 2014/0089824 A1 * | 3/2014 | George et al. | 715/762 |

FOREIGN PATENT DOCUMENTS

| | | |
|---|---|---|
| JP | 2011-75718 A | 4/2011 |
| KR | 10-2008-0094200 A | 10/2008 |

\* cited by examiner

*Primary Examiner* — Mulugeta Mengesha
(74) *Attorney, Agent, or Firm* — Birch, Stewart, Kolasch & Birch, LLP

(57) ABSTRACT

The present disclosure relates to an image display apparatus, and more particularly, an image display apparatus capable of displaying screen information. The image display apparatus includes a display configured to display screen information, an interface configured to receive an input signal with respect to the display, and a controller configured to display a menu item for controlling the screen information, wherein the display outputs the screen information on an inner region of rounded corners of the display, and wherein the controller decides a shape of the menu item to be displayed on a point where the input signal has been received, in response to the reception of the input signal.

18 Claims, 19 Drawing Sheets

FIG. 7A
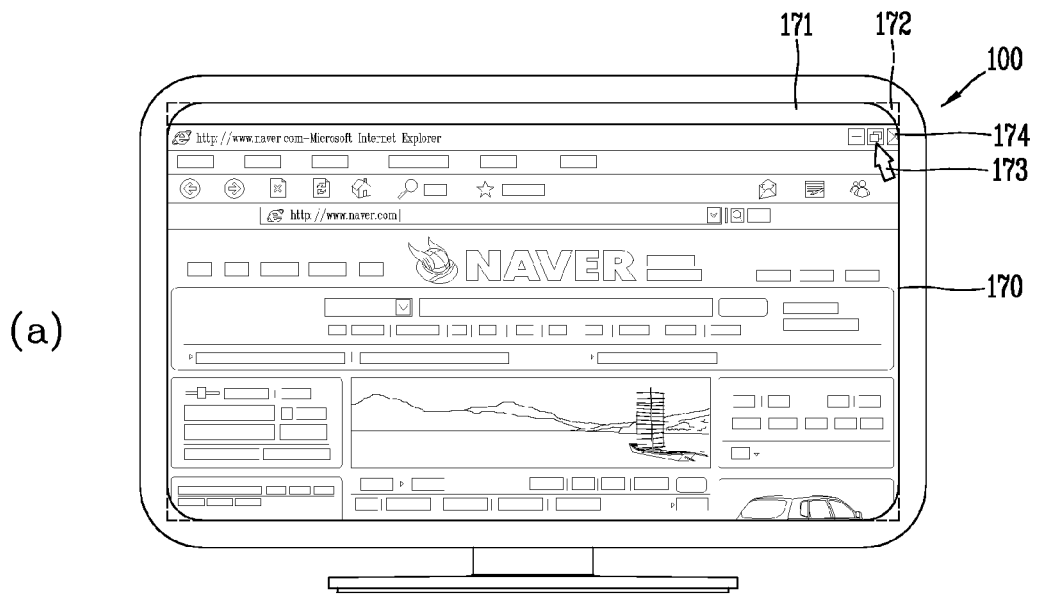
(a)
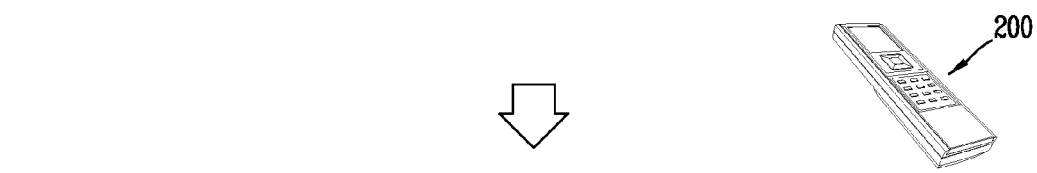
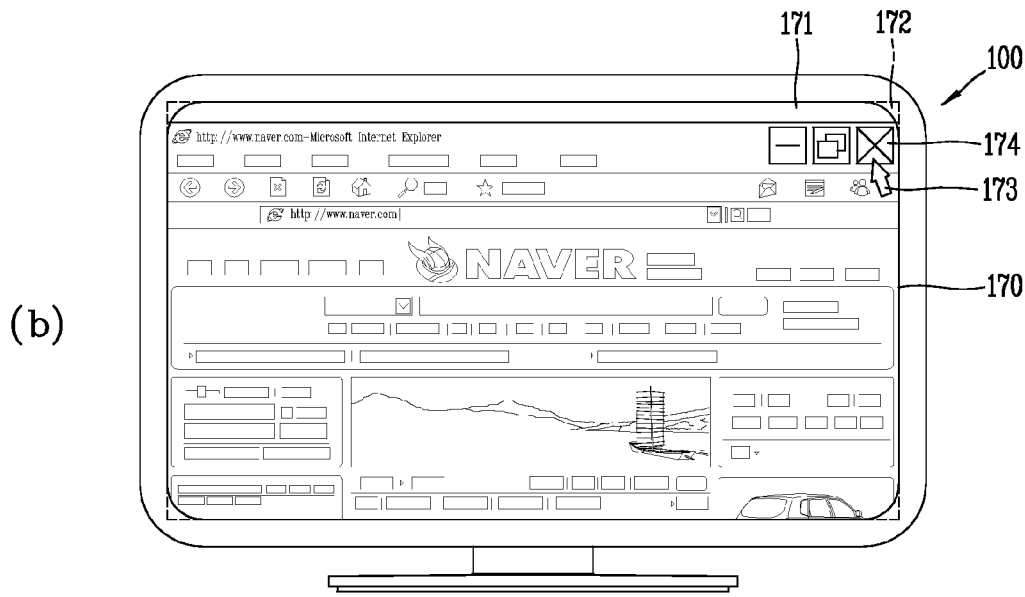
(b)
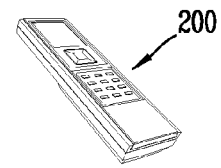

FIG. 7B
(a) 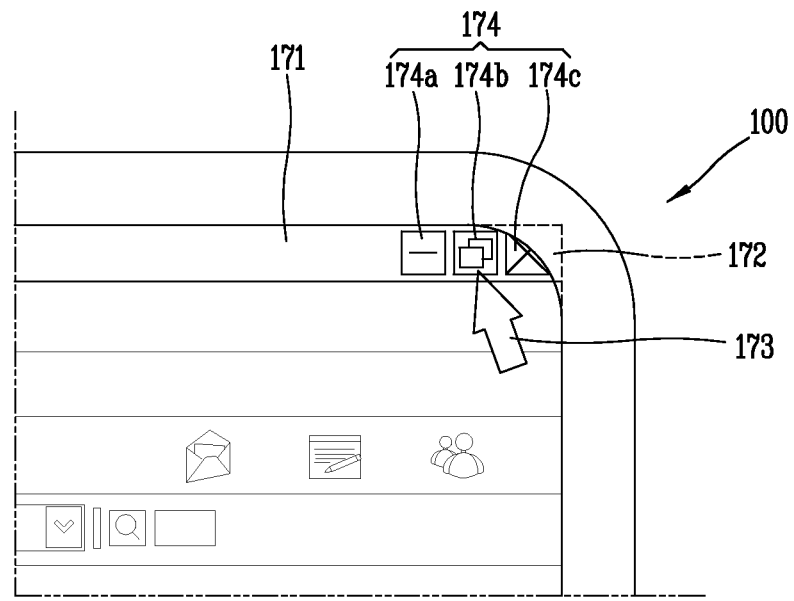
(b) 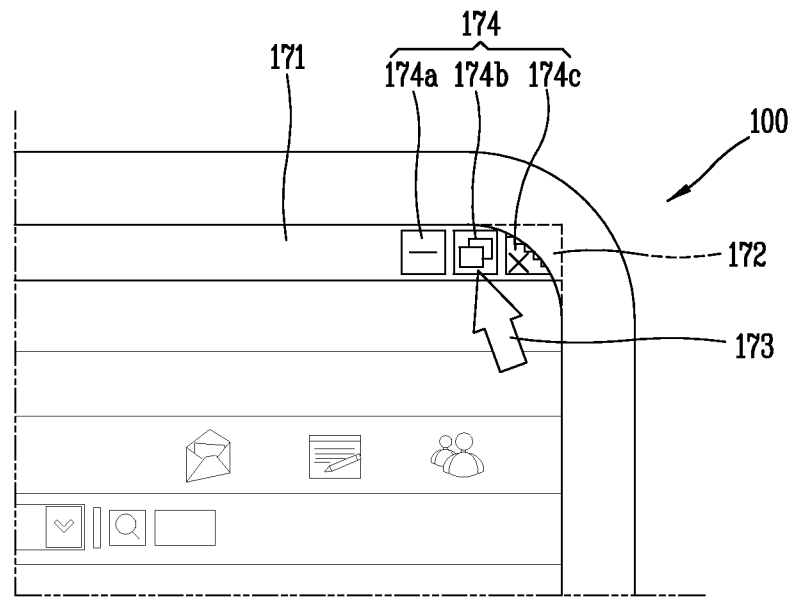

FIG. 8
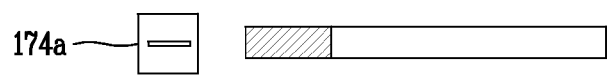
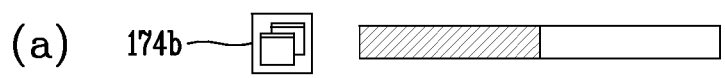
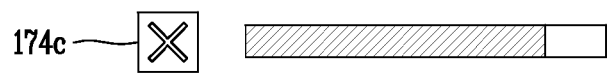
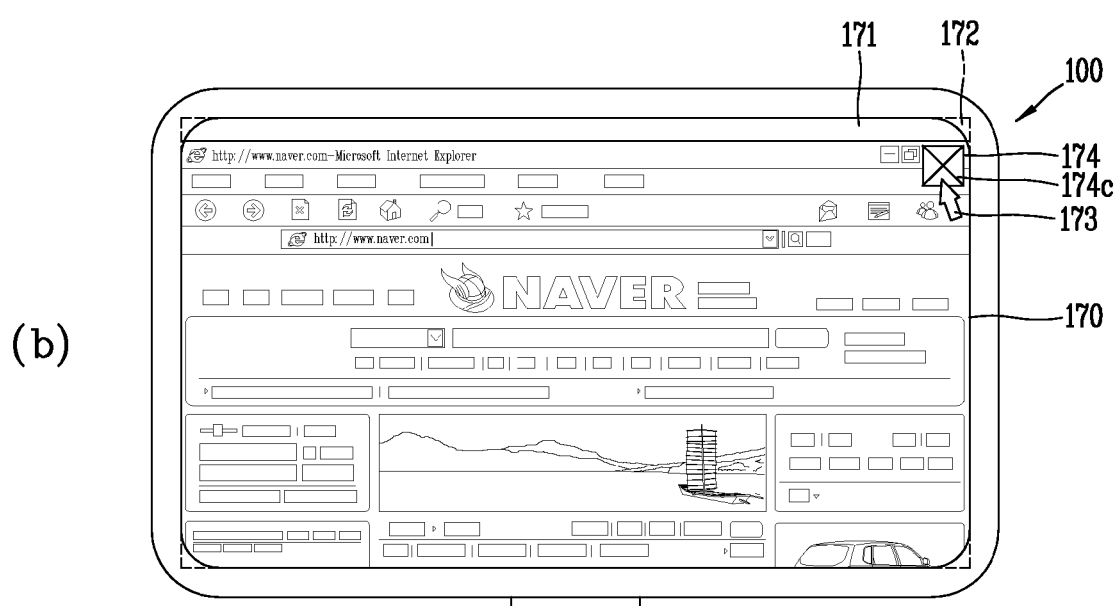
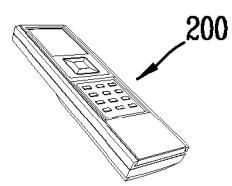

FIG. 10
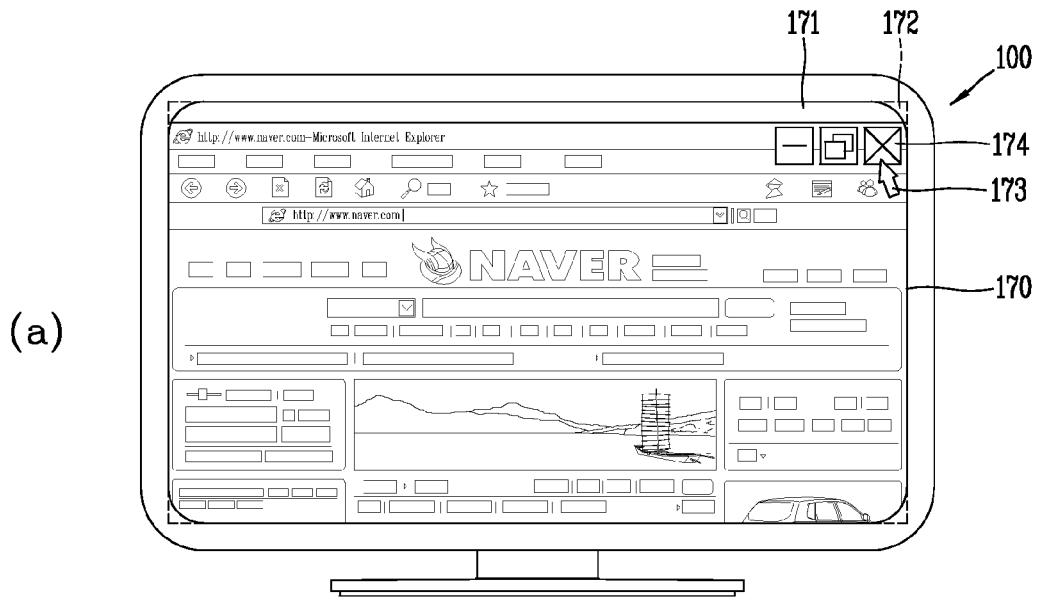
(a)
AFTER A PRESET TIME LAPSES
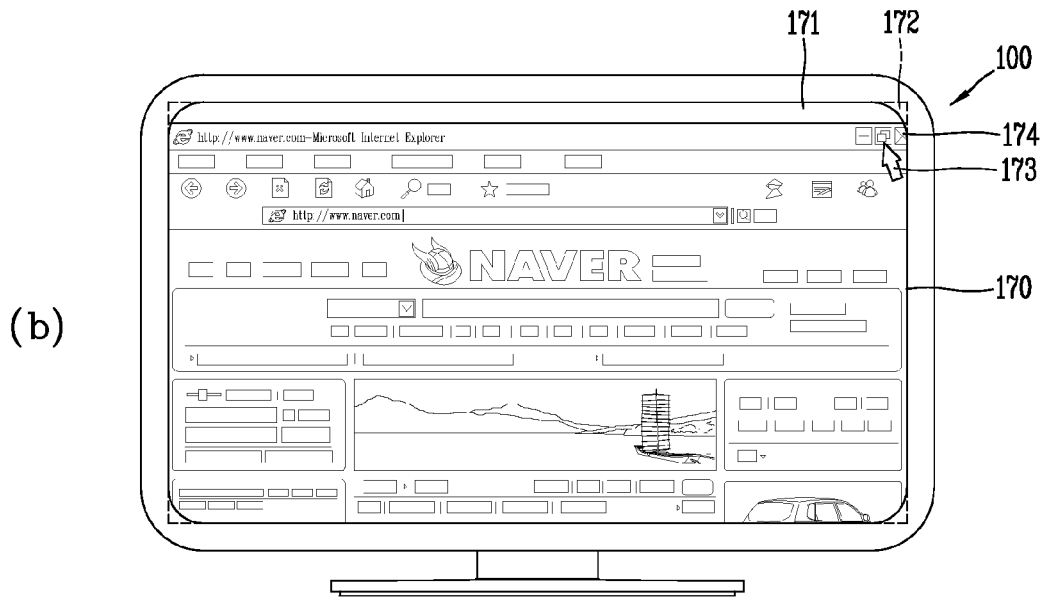
(b)
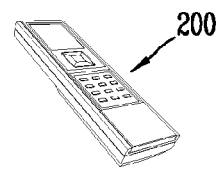

FIG. 11
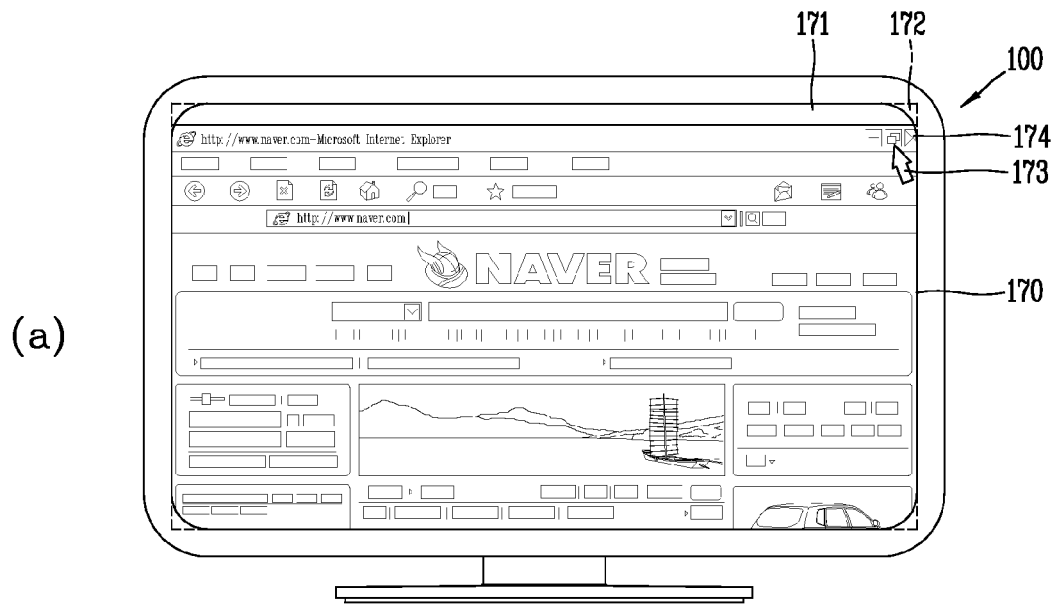
(a)
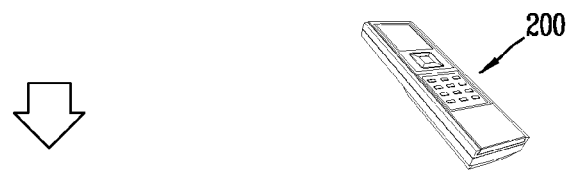
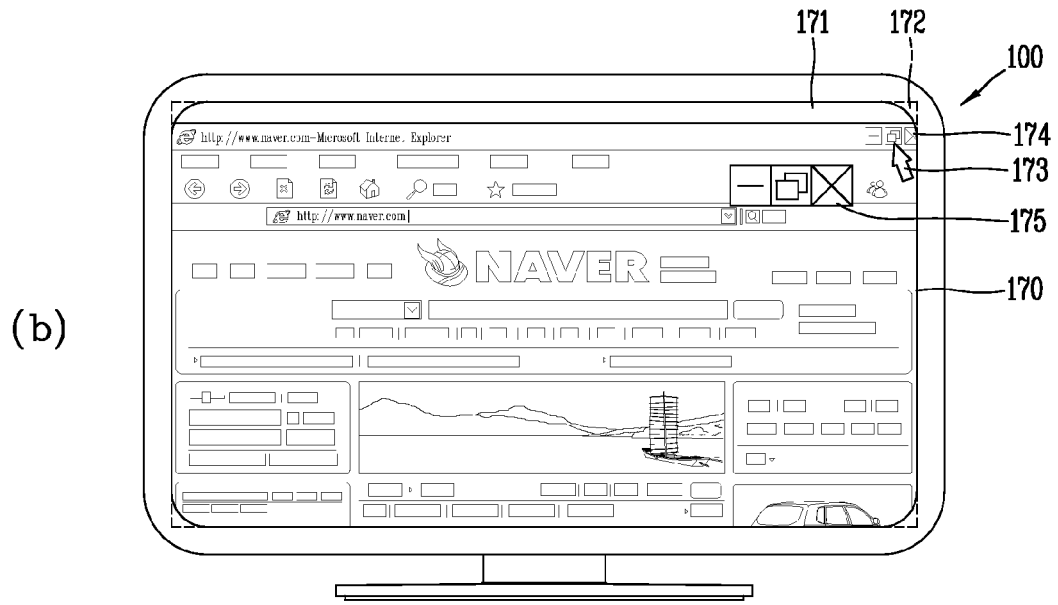
(b)

FIG. 12
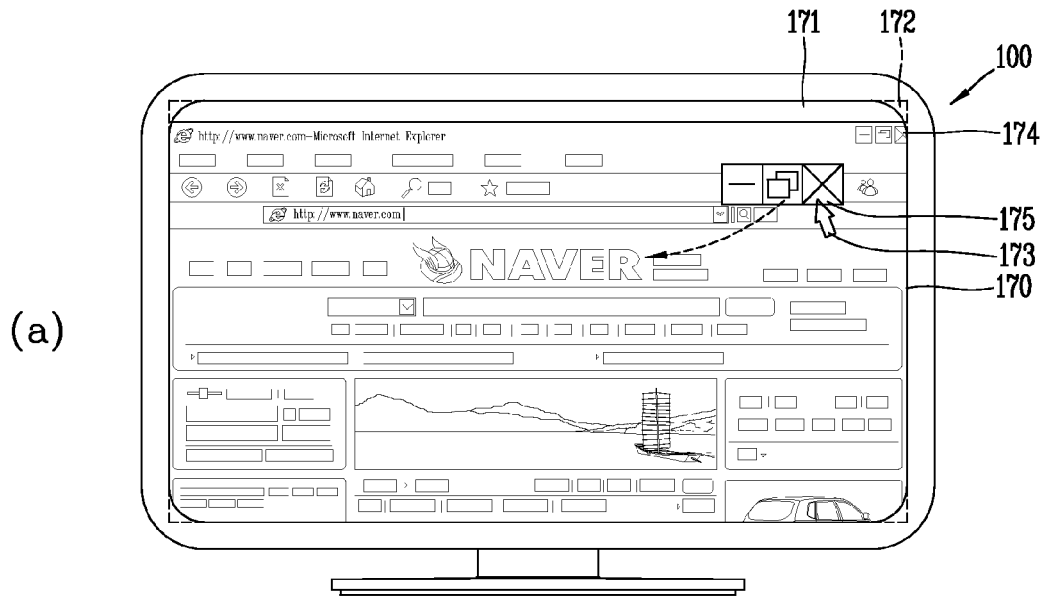
(a)
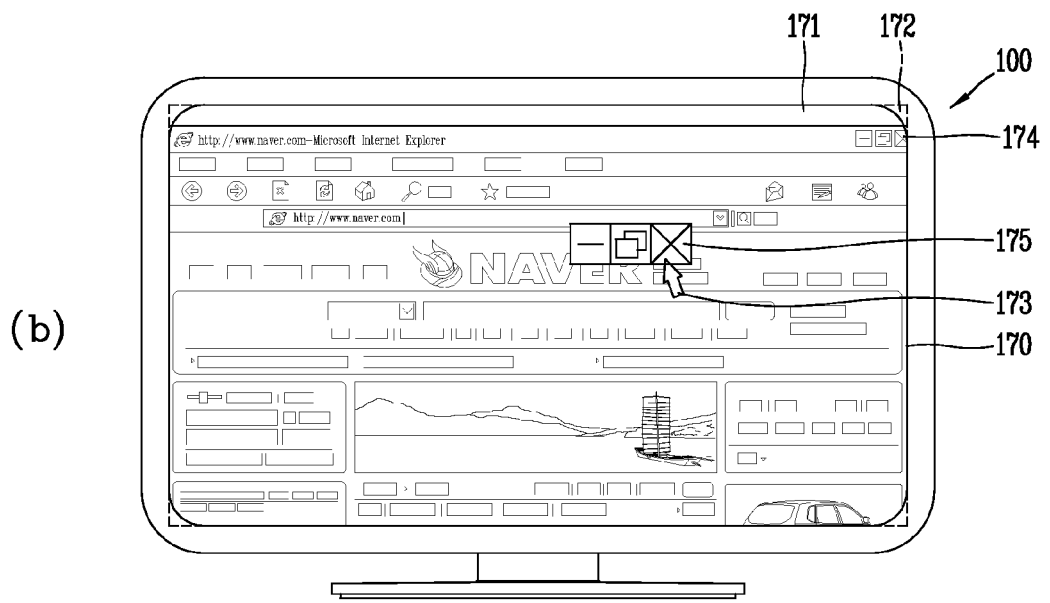
(b)

FIG. 17
(a)
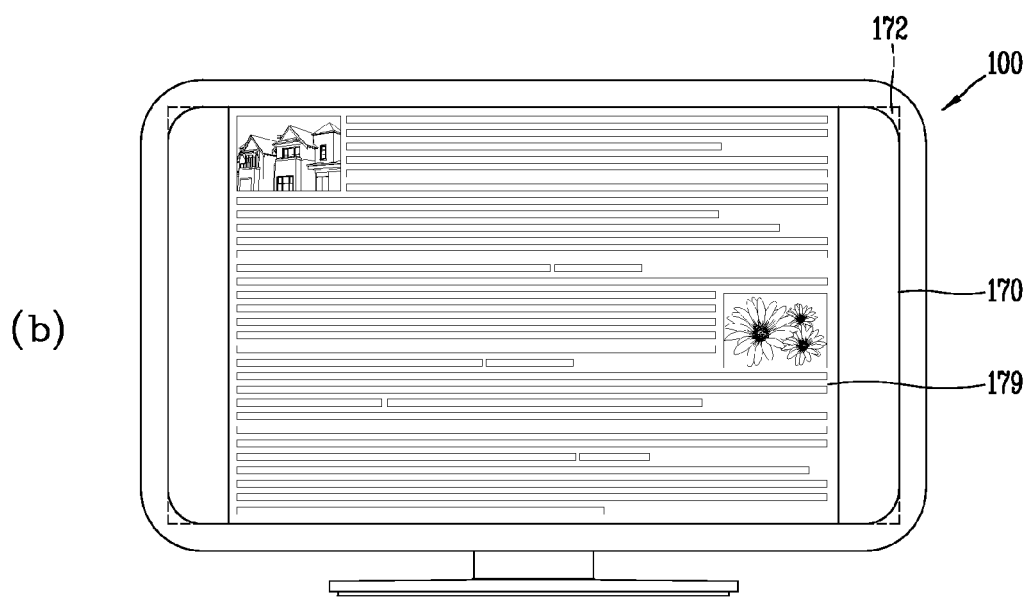
(b)

IMAGE DISPLAY APPARATUS AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0028219, filed on Mar. 15, 2013, the contents of which is incorporated by reference herein in its entirety.

BACKGROUND OF THE DISCLOSURE

1. Field of the Disclosure

This specification relates to an image display apparatus, and particularly, to an image display apparatus capable of displaying screen information and a control method thereof.

2. Background of the Disclosure

An image display apparatus refers to an apparatus for displaying a user-desired image (still and moving images) through an analog broadcasting system or a digital broadcasting system. In other words, the image display apparatus receives a broadcast signal sent from a broadcasting station and display an image corresponding to a broadcasting program selected by a user input. Recently, the analog broadcasting system is changing into the digital broadcasting system.

The digital broadcasting system refers to a broadcasting system which transmits digital images and audio sounds. Comparing with the analog broadcasting system, the digital broadcasting system exhibits several characteristics, such as a less data loss due to being strong to external noise, an advantage in error correction, high resolution, and a clear screen. Also, the digital broadcasting system can provide bi-directional services, unlike the analog broadcasting system.

With the improvements, the image display apparatus may display images with improved qualities. In the meantime, the need of an image display apparatus, which has an improved design of appearance, as well as displaying such images with the improved qualities has come to the front.

SUMMARY OF THE DISCLOSURE

Therefore, an aspect of the detailed description is to provide an image display apparatus capable of exhibiting an improved design of appearance and enhancing user convenience.

To achieve these and other advantages and in accordance with the purpose of this specification, as embodied and broadly described herein, there is provided an image display apparatus including a display configured to display screen information, an interface configured to receive an input signal with respect to the display, and a controller configured to display a menu item for controlling the screen information, wherein the display may output the screen information on an inner region of rounded corners of the display, and the controller may decide a shape of the menu item to be displayed on a point where the input signal has been received, in response to the reception of the input signal.

In accordance with one aspect, the display may have the corners rounded, and pixels may be arranged on the inner region of the display based on the rounded portions.

In accordance with one aspect, when the input signal is received, the controller may display an object on the input signal-received point of the display, the object indicating the reception of the input signal.

In accordance with one aspect, when the input signal is received on a region adjacent to one of the corners of the display, the controller may display the menu item to be displayed on the input signal-received point in another shape.

In accordance with one aspect, the controller may restore the shape of the menu item which has been displayed in the another shape when a preset time lapses.

In accordance with one aspect, when the menu item is selected, the controller may control the control information based on the selected menu item and restore the shape of the menu item which has been displayed in the another shape.

In accordance with one aspect, when the input signal is received on the region adjacent to the one of the corners of the display, the controller may display the menu item by enlarging a size of the menu item.

In accordance with one aspect, the menu item may include a plurality of icons, and the controller may display at least one of the plurality of icons by enlarging a size of the at least one icon.

In accordance with one aspect, the controller may decide the at least one icon to be displayed by extending the size based on information related to a user's use pattern.

In accordance with one aspect, when the input signal is received on the region adjacent to the one of the corners of the display, the controller may display a pop-up window including the menu item.

In accordance with one aspect, the controller may move the position of the pop-up window based on an input signal received on the pop-up window.

In accordance with one aspect, when the input signal is received on the region adjacent to the one of the corners of the display, the controller may display the menu item on the input signal-received point. Here, the controller may move the position of the menu item to another position, adjacent to the input signal-received point, for a preset time, and then restore the position of the menu item after the preset time lapses.

In accordance with one aspect, when a preset input signal is received, the controller may display a thumbnail image for the screen information, displayed on the display, on one region of the display.

In accordance with one aspect, the controller may control the screen information displayed on the display based on an input signal received on the thumbnail image.

In accordance with one aspect, the controller may move a position of the thumbnail image based on an input signal received on the thumbnail image.

In accordance with one aspect, the controller may decide a scaling ratio of the screen information based on at least one of attribute information related to the screen information displayed on the display and information related to a user's use pattern.

To achieve these and other advantages and in accordance with the purpose of this specification, as embodied and broadly described herein, there is provided a method for controlling an image display apparatus including, displaying screen information on an inner region of rounded corners of a display, receiving an input signal with respect to the display, displaying a menu item for controlling the screen information, and deciding a shape of the menu item to be displayed on a point where the input signal has been received, in response to the reception of the input signal In accordance with one aspect, the display may have the corners rounded, and pixels may be arranged on the inner region of the display based on the rounded portions.

In accordance with one aspect, the method may further include displaying an object on an input signal-received point of the display, the object indicating the reception of the input signal, when the input signal is received.

In accordance with one aspect, the deciding of the shape of the menu item may include displaying the menu item, to be displayed on the input signal-received point, in another shape when the input signal is received on a region adjacent to one of the corners of the display.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 7A to 9 are conceptual views illustrating an exemplary operation of displaying a menu item with its size enlarged;

FIG. 10 is a conceptual view illustrating an exemplary operation of restoring a size of the menu item after a preset time lapses;

FIGS. 11 and 12 are conceptual views illustrating an exemplary operation of displaying a pop-up window including a menu item;

FIGS. 16 and 17 are conceptual views illustrating an exemplary operation of deciding a scaling ratio of screen information.

DETAILED DESCRIPTION OF THE DISCLOSURE

Description will now be given in detail according to the exemplary embodiments, with reference to the accompanying drawings. The exemplary embodiments of the present disclosure are merely illustrative, and the present disclosure may be implemented in various forms. For the sake of brief description with reference to the drawings, the same or equivalent components will be provided with the same reference numbers, and description thereof will not be repeated.

In this specification, an image display apparatus may include both an apparatus for recording reproducing a video and an apparatus for recording and reproducing an audio.

Hereinafter, a digital television (DTV) will be described as an example of the display apparatus. However, the display apparatus disclosed herein may not be limited to the DTV. For example, the display apparatus may include a set-top box (STB), an Internet protocol TV (IPTV), a personal computer or the like.

Figure 1:
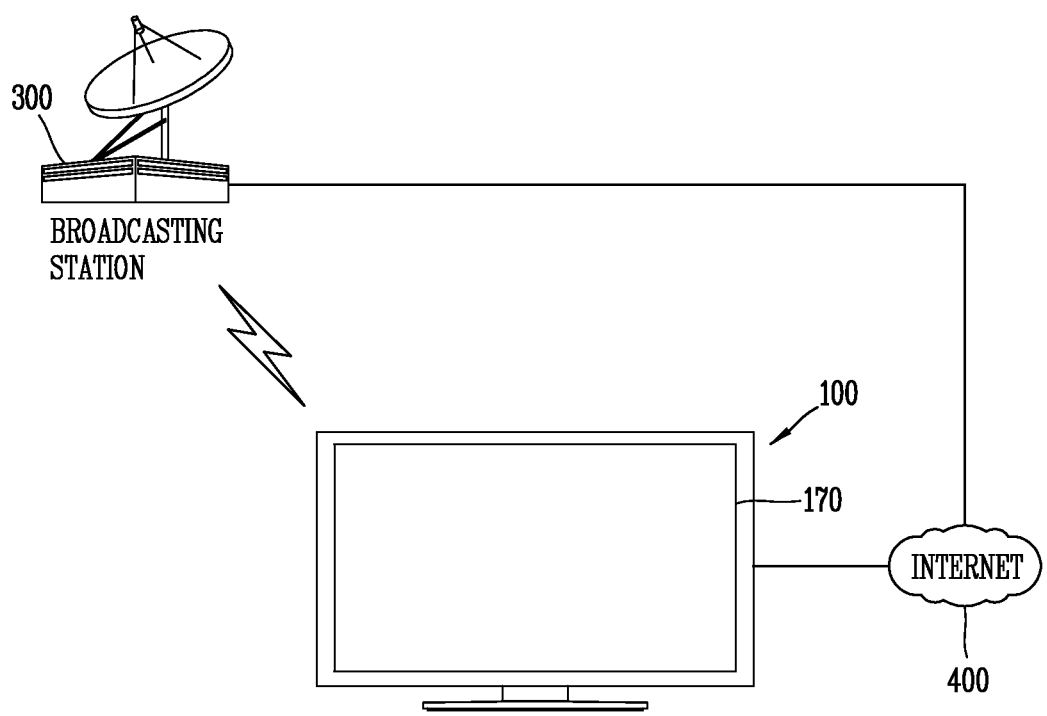
FIG. 1 is a conceptual view of a system having an image display apparatus (or video display apparatus) according to the present disclosure.

FIG. 1 is a conceptual view of a system having an image display apparatus 100 according to the present disclosure. The system, as illustrated in FIG. 1, may include an image display apparatus 100, a broadcasting station 300 and an Internet 400. The image display apparatus 100 may receive a broadcast signal from the broadcasting station 300 and output the received broadcast signal. Also, the image display apparatus 100 may include a device for accessing the Internet 400 by a transmission control protocol/Internet protocol (TCP/IP).

Figure 2:
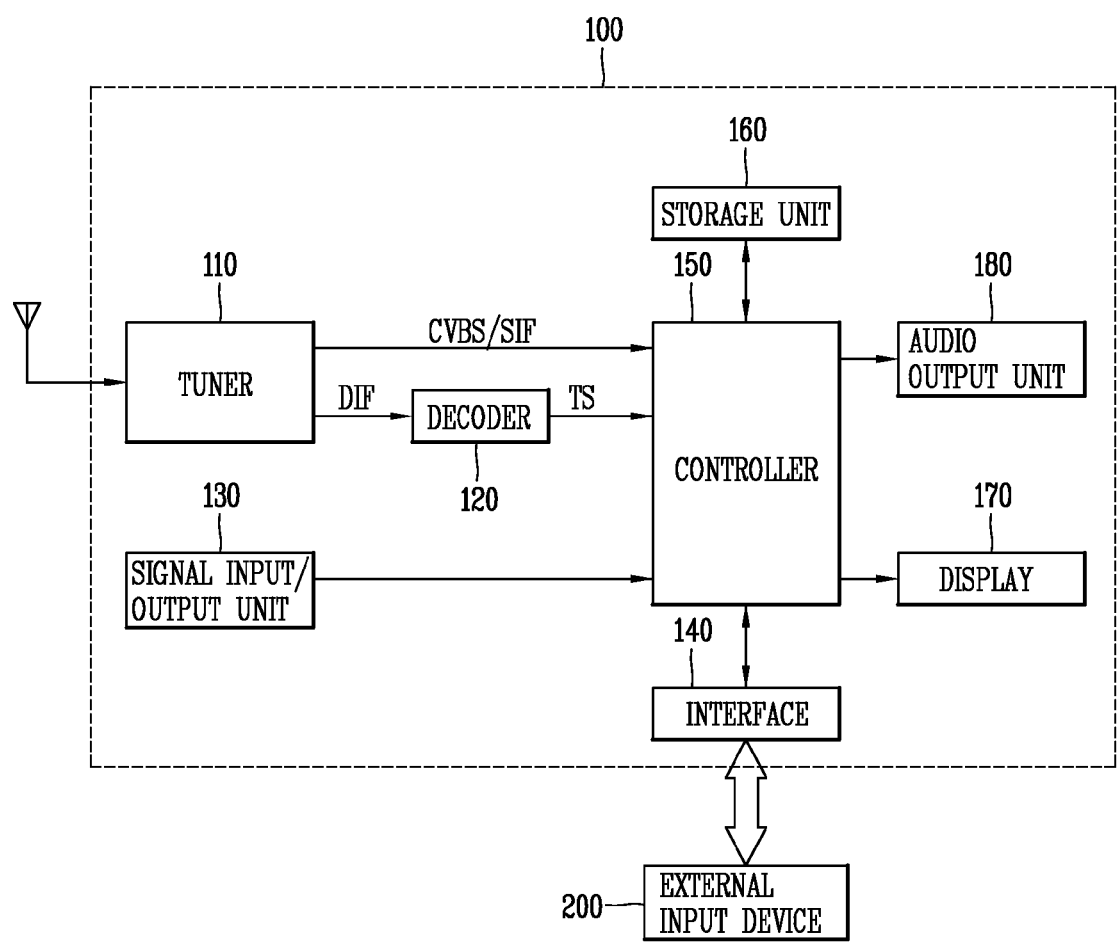
FIG. 2 is a block diagram illustrating an image display apparatus and an external input device in accordance with the present disclosure.

FIG. 2 is a block diagram illustrating an image display apparatus 100 and an external input device 200 according to the present disclosure. The image display apparatus 100 may include a tuner 110, a decoder 120, a signal input/output unit 130, an interface 140, a controller 150, a storage unit 160, a display 170 and an audio output unit 180.

Referring to FIG. 2, the tuner 110 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video/audio signal (CVBS/SIF). The tuner 110 may thus be a hybrid tuner which is capable of processing the digital broadcast signal and the analog broadcast signal.

The digital IF signal (DIF) output from the tuner 110 may be input into the decoder 120, while the analog baseband video/audio signal (CVBS/SIF) output from the tuner 110 may be input into the controller 150. The tuner 110 may receive a signal carrier RF broadcast signal according to an advanced television systems committee (ATSC) standard or a multi-carrier RF broadcast signal according to a digital video broadcasting (DVB) standard.

Although the drawing illustrates one tuner 110, the present disclosure may not be limited to this. The image display apparatus 100 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 120 may receive the digital IF signal (DIF) converted by the tuner 110 and decode the received signal. For example, when the DIF output from the tuner 110 is a signal according to the ATSC standard, the decoder 120 may perform 8-vestigal side band (8-VSB) demodulation. Here, the decoder 120 may also perform channel decoding, such as trellis decoding, de-interleaving, reed Solomon decoding and the like. To this end, the decoder 120 may include a trellis decoder, de-interleaver, a reed Solomon decoder and the like.

As another example, when the digital IF signal (DIF) output from the tuner 110 is a signal according to the DVB standard, the decoder 120 may perform a coded orthogonal frequency division modulation (COFDMA) demodulation. Here, the decoder 120 may also perform convolution decoding, de-interleaving, reed Solomon decoding and the like. To this end, the decoder 120 may include a convolution decoder, a de-interleaver, a reed Solomon decoder and the like.

The signal input/output unit 130 may perform signal input and output operations by being connected to an external device. To this end, the signal input/output unit 130 may include an A/V input/output unit and a wireless communication unit.

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, a liquid HD terminal and the like. Digital signals input through those terminals may be forwarded to the controller 150. Here, analog signals input through the CVBS terminal and the S-video terminal may be forwarded to the controller after being converted into digital signals through an analog-digital converter (not shown).

The wireless communication unit may execute wireless Internet access. For example, the wireless communication unit may execute the wireless Internet access using wireless LAN (WLAN) (Wi-Fi), wireless broadband (Wibro), world interoperability for microwave access (Wimax), high speed downlink packet access (HSDPA) and the like. The wireless communication unit may also perform short-range wireless communication with other electronic devices. For example, the wireless communication unit may perform the short-range wireless communication using Bluetooth, radio frequency identification (RFID), infrared data association (IrDA), ultra wideband (UWB), Zigbee and the like.

The signal input/output unit 130 may transfer to the controller 150 a video signal, an audio signal and a data signal, which are provided from external devices, such as a digital versatile disk (DVD) player, a blu-ray player, a game player, a camcorder, a computer (notebook computer), a portable device, a smart phone and the like. Also, the signal input/output unit 130 may transfer to the controller 150 a video signal, an audio signal and a data signal of various media files, which are stored in an external storage device, such as a memory, a hard disk and the like. In addition, the signal input/output unit 130 may output a video signal, an audio signal and a data signal processed by the controller 150 to other external devices.

The signal input/output unit 130 may perform signal input and output operations by being connected to a set-top box, for example, an Internet protocol TV (IPTV) set-top box via at least one of those various terminals. For instance, the signal input/output unit 130 may transfer to the controller 150 a video signal, an audio signal and a data signal, which has been processed by the IPTV set-top box to enable bidirectional communication, and also transfer signals processed by the controller 150 to the IPTV set-top box. Here, the IPTV may include ADSL-TV, VDSL-TV, FTTH-TV and the like which are divided according to a transmission network.

Digital signals output from the decoder 120 and the signal input/output unit 130 may include a stream signal (TS). The stream signal (TS) may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

The interface 140 may receive an input signal for power control, channel selection, screen setting or the like from an external input device 200 or transmit a signal processed by the controller 150 to the external input device 200. The interface 140 and the external input device 200 may be connected to each other in a wired or wireless manner.

The controller 150 may control an overall operation of the display apparatus 100. For example, the controller 150 may control the tuner 110 to tune an RF broadcast signal corresponding to a user-selected channel or a pre-stored channel. Although not shown, the controller 150 may include a demultiplexer, a video processer, an audio processor, a data processor, an On screen display (OSD) generator and the like.

The controller 150 may demultiplex an MPEG-2 TS signal into a video signal, an audio signal and a data signal.

The controller 150 may perform a video processing, for example, demodulation (decoding) for a demultiplexed video signal. In more detail, the controller 150 may decode an MPEG-2 encoded video signal using an MPEG-2 decoder, and decode an H.264-encoded DMB or DVB-handheld (DVB-H) signal using an H.264 decoder. Also, the controller 150 may adjust brightness, tint or color of the video signal. The video signal processed by the controller 150 may be transferred to the display 170 or an external output device (not shown) via an external output terminal.

The controller 150 may process, for example, decode a demultiplexed audio signal. In more detail, the controller 150 may decode an MPEG-2 encoded audio signal using an MPEG-2 decoder, an MPEG-4 bit sliced arithmetic coding (BSAC)-encoded DMB audio signal using an MPEG-4 decoder, and an MPEG-2 advanced audio codec (AAC)-encoded DMB or DVB-H audio signal using an AAC decoder. Also, the controller 150 may adjust base, treble and sound volume of the audio signal. The audio signal processed by the controller 150 may be transferred to the audio output unit 180, for example, a speaker, or transferred to an external output device.

The controller 150 may process an analog baseband video/audio signal (CVBS/SIF). Here, the analog baseband video/audio signal (CVBS/SIF) input to the controller 150 may be an analog baseband video/audio signal output from the tuner 110 or the signal input/output unit 130. The processed video signal may be displayed on the display 170 and the processed audio signal may be output through the audio output unit 180.

The controller 150 may process, for example, decode a demultiplexed data signal. Here, the data signal may include electronic program guide (EPG) information, which may include broadcast information, such as start time, end time and the like, related to a broadcast program broadcasted on each channel. The EPG information may include ATSC-program and system information protocol (ATSC-PSIP) information and DVB-service information (DVB-SI) information. The ATSC-PSIP information or DVB-SI information may be included in an MPEG-4 TS header (4 bytes).

The controller 150 may perform on-screen display (OSD) processing. In more detail, the controller 150 may generate an OSD signal for displaying various information as graphic or text data based on at least one of a video signal and a data signal or an input signal received from the external input device 200. The OSD signal may include various data such as a user-interface (UI) screen for the image display apparatus 100 and various menu screens, widgets, icons and the like.

The storage unit 160 may store various programs for signal processing and control by the controller 150, and may also store processed video, audio and data signals. The storage unit 160 may include at least one of a flash memory-type storage medium, a hard disc-type storage medium, a multimedia card micro-type storage medium, a card-type memory (for example, SD or XD memory), a random access memory (RAM), a read-only memory (ROM), electrically erasable programmable ROM (EEPROM), a magnetic memory, a magnetic disk and an optical disk.

The display 170 may convert a processed video signal, a processed data signal, and an OSD signal provided by the controller 160 into RGB signals, thereby generating driving signals. The display 170 be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display 170 may also be implemented as a touch screen and may thus be used as an input device.

The audio output unit 180 may receive a processed audio signal (e.g., a stereo signal or a 5.1-channel signal) from the controller 160. The audio output unit 180 may be implemented in various types of speakers.

The external input device 200 may be connected to the interface 140 in a wired or wireless manner so as to transmit an input signal generated in response to a user's input to the interface 140. The external input device 200 may include a remote control device, a mouse, a keyboard and the like. The remote control device may transmit an input signal to the interface using various communication techniques such as Bluetooth, RF, IR, UWB and ZigBee. The remote control device may be a spatial remote control device. The spatial remote control device may generate an input signal by sensing an operation of a main body within a space.

The display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the display apparatus 100 may be an IPTV digital broadcast receiver capable of receiving cable broadcast programs, satellite broadcast programs or IPTV programs.

Figure 3:
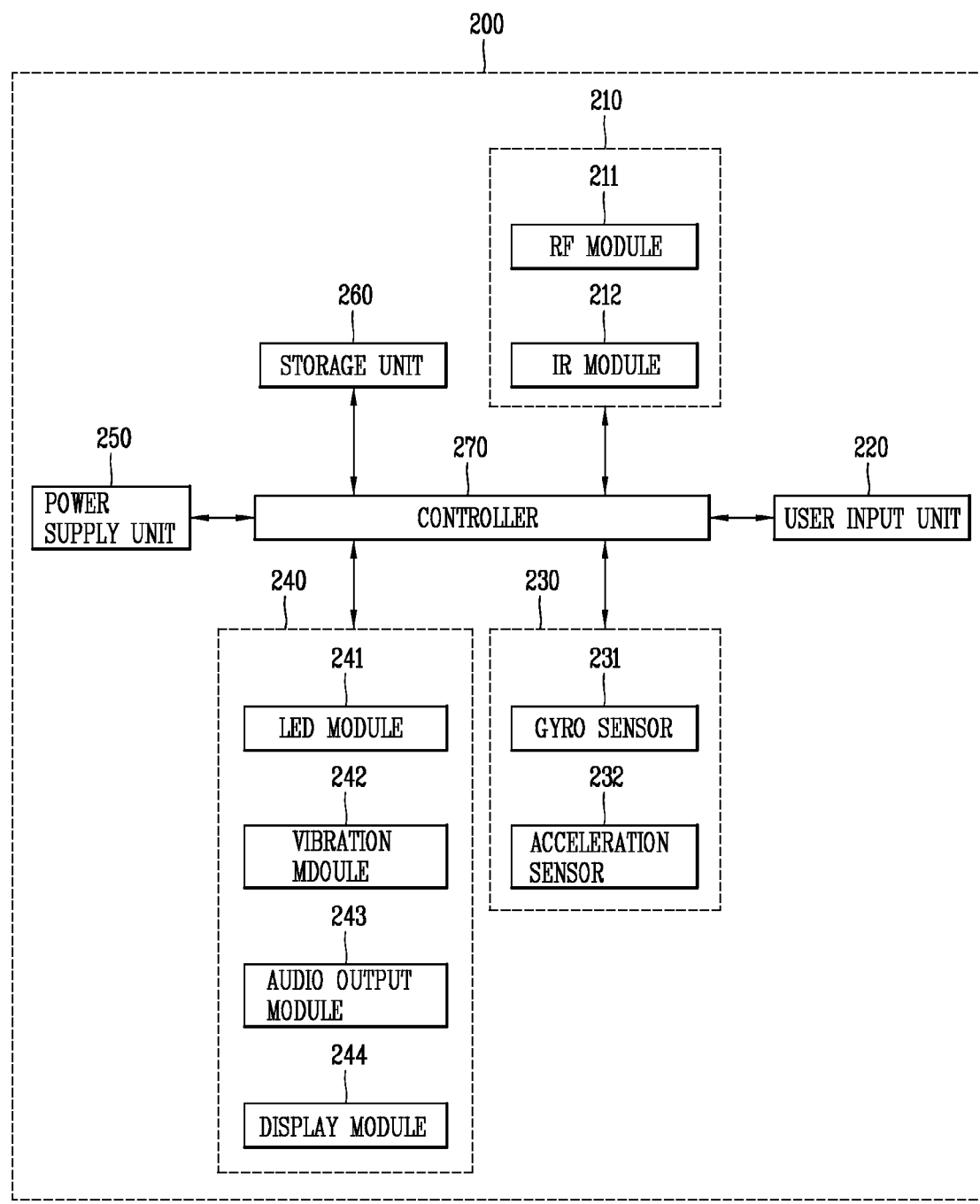
FIG. 3 is a block diagram illustrating the external input device of FIG. 2 in detail.

FIG. 3 is a block diagram illustrating the external input device 200 of FIG. 2 in detail. The external input device 200 may include a wireless communication unit 210, a user input unit 220, a sensing unit 230, an output unit 240, a power supply unit 250, a storage unit 260 and a controller 270.

Referring to FIG. 3, the wireless communication unit 210 may transmit a signal to the image display apparatus 100 or receive a signal from the image display apparatus 100. To this end, the wireless communication unit 210 may include an RF module 211 and an IR module 212. The RF module 211 may transmit and receive signals according to an RF communication standard by being connected to the interface 140 of the image display apparatus 100. The IF module 212 may transmit and receive signals according to an IF communication standard by being connected to the interface 140 of the image display apparatus 100.

The user input unit 220 may include as an input element a keypad, a key button, a scroll key, a jog key and the like. The user may manipulate the user input unit 220 to input (enter) commands (instructions) involved with the image display apparatus 100. The command, for example, may be entered as the user pushes a hard key button of the user input unit 200.

The sensing unit 130 may include a gyro sensor 231 and an acceleration sensor 232. The gyro sensor 231 may sense a spatial movement of the external input device 200 based on X, Y and Z axes. The acceleration sensor 232 may sense a moving speed of the external input device 200 and the like.

The output unit 240 may output information in response to manipulation of the user input unit 230 and information corresponding to a signal sent by the image display apparatus 100. Therefore, the user may recognize the manipulation state of the user input unit 230 or the control state of the image display apparatus 100 through the output unit 230. For example, the output unit 240 may include an LED module 241 which is turned on and off, a vibration module 242 which generates vibration, an audio output module 243 which outputs sound, and a display module 244 which outputs images, in response to the manipulation of the user input unit 230 or transmission and reception of signals through the wireless communication unit 210.

The power supply unit 250 may supply power to various electronic elements of the external input device 200. The power supply of the power supply unit 250 may be stopped when the external input device 200 does not move for a predetermined time, thereby reducing power consumption. The power supply unit 250 may resupply power when a predetermined key of the external input device 200 is manipulated.

The storage unit 260 may store various programs, which are involved with control and operations of the external input device 200, applications, frequency band information and the like. The controller 270 may execute an overall control operation of the external input device 200.

The external input device 200 described herein may include a remote controller. The external input device 200 may also include a camera mounted onto the image display apparatus 100. Here, the image display apparatus 100 may receive an external control command (for example, by a user's motion) through the camera. In addition, the external input device 200 may include a microphone mounted onto the image display apparatus 100. Here, the image display apparatus 100 may receive an externally input control command (for example, by a user's voice signal) through the microphone.

Figure 4:
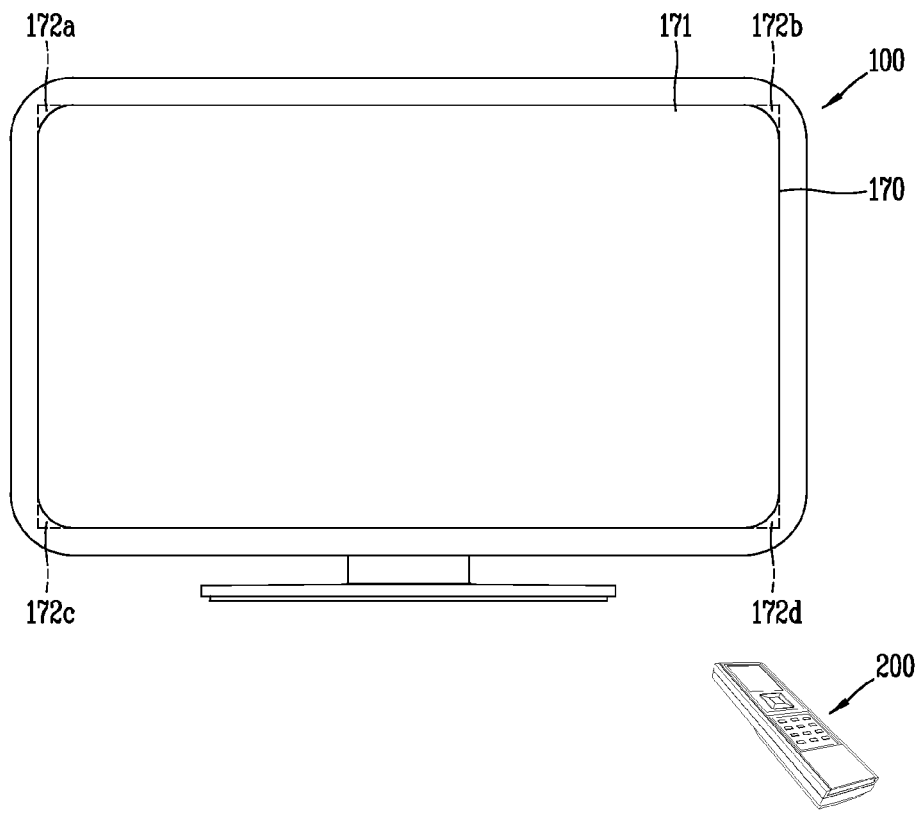
FIG. 4 is a conceptual view illustrating an image display apparatus in accordance with one exemplary embodiment.

FIG. 4 is a conceptual view illustrating an image display apparatus in accordance with one exemplary embodiment.

Referring to FIG. 4, the image display apparatus 100 may include a bezel and a display 170.

Pixels may be arranged in a predetermined form (for example, in a matrix form) on the display 170. The pixel refers to a unit element configuring a screen. The pixel may receive a signal input.

Corners of the display 170 may be rounded. The pixels may be arranged on an inner region of the display 170 based on the rounded portions. Here, an area on which the pixels are arranged may be referred to as a pixel region 171, and an area on which the pixels are not arranged may be referred to as a non-pixel region 172.

Screen information may be displayed on an inner region of the rounded portions of the display 170, namely, the pixel region 171. Also, a signal from the interface 140 (see FIG. 2) may be input only to the pixel region 171.

As illustrated in FIG. 4, corners of the bezel of the image display apparatus 100 may also be rounded. With rounding the bezel as well as the display 170, a thickness of the bezel may be reduced (for example, less than 5 mm). Therefore, the image display apparatus 100 may provide the user with aesthetic appeal.

Figure 5:
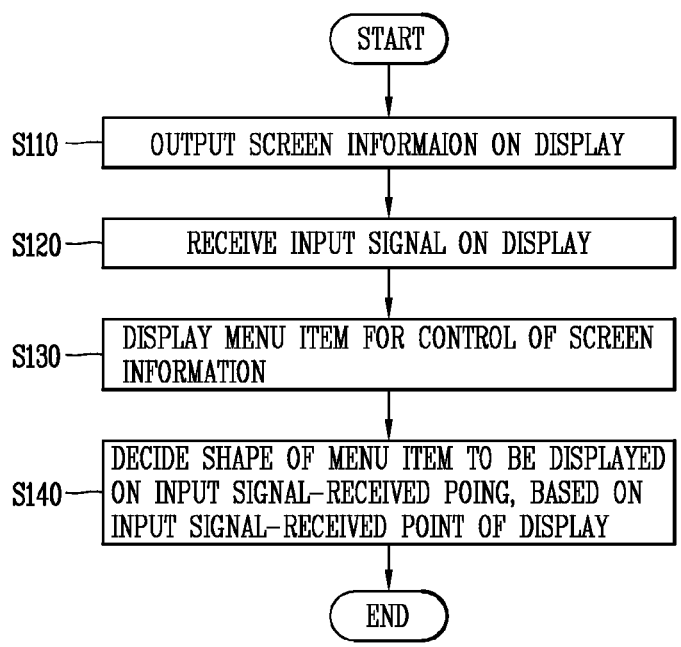
FIG. 5 is a flowchart illustrating a method of controlling an image display apparatus in accordance with one exemplary embodiment.

FIG. 5 is a flowchart illustrating a method of controlling the image display apparatus 100 (see FIG. 2) in accordance with one exemplary embodiment. The image display apparatus 100 may include a display 170 (see FIG. 2), an interface 140 (see FIG. 2), and a controller 150 (see FIG. 2).

As illustrated in FIG. 5, screen information may be displayed on the display 170 (S110).

In detail, the display 170 may include a pixel region where pixels are arranged and a non-pixel region where pixels are not arranged. Corners of the display 170 may be rounded and the pixels may be arranged on an inner region and not be arranged on an outer region, based on the rounded portions. The screen information may be displayed on the pixel region of the display 170.

The display 170 may output at least one of an application execution screen, a page including image or text, a webpage, an e-mail, an e-document and contents of a social network service (SNS). Here, the screen information refers to every information output on at least partial region of the display 170.

An input signal with respect to the display 170 may be received (S120).

In detail, the controller 150 may receive an input signal on the display 170 from an external input device (for example, a remote controller) 200 through the interface 140. For example, the external input device 200 may transmit an input signal for power control, channel selection, screen setting and the like to the image display apparatus 100.

The external input device 200 may transmit the input signal with respect to the display 170. Here, the display 170 may output an object (for example, an image with a shape of a mouse pointer) on a point where the input signal has been received. The user may manipulate the image display apparatus 100, like manipulating a computer with a mouse, with viewing the object output on the display 170.

The controller 150 may sense a point that the input signal has been received on the display 170. In detail, the controller 150 may sense the point that the input signal has been received on the display 170 based on coordinate values of the received input signal (for example, X and Y coordinate values).

In addition, the controller 150 may check in real time whether or not the coordinate values of the input signal are out of coordinate values of the rounded portions of the display 170. If the coordinate values of the input signal are out of the coordinate values of the rounded portions of the display 170, the controller 150 may control the object to be continuously output on the pixel region adjacent to the rounded portions.

Afterwards, a menu item for controlling the screen information may be displayed (S130).

As one example, when an input signal is received through the interface 140, the controller 150 may display a menu item for controlling the screen information on a point where the input signal has been received. For example, when a webpage is currently displayed as the screen information, the controller 150 may display a menu item including icons, which correspond to a function of minimizing a displayed webpage, a function of restoring a size of a webpage, and a function of closing a webpage, respectively.

As another example, even if an input signal is not received through the interface 140, the controller 150 may continuously display the menu item for controlling the screen information, along with the screen information.

Next, a shape of the menu item to be displayed on the point where the input signal has been received may be decided based on the input signal-received point of the display 170 (S140).

In detail, the controller 150 may detect the input signal-received point of the display 170. Here, when the input signal-received point is adjacent to the non-pixel region, the controller 150 may display the menu item, which is to be displayed on the input signal-received point, into another shape.

As one example, when the input signal is received on a region adjacent to one of the corners of the display 170, the controller 180 may display a menu item, which is to be displayed on the input signal-received point, by enlarging a size of the menu item. The controller 150 may also display a pop-up window including the menu item. The controller 150 may move a position of the menu item for a preset time and then restore the position after the preset time lapses. Here, a bounce-back effect of the menu item may be generated.

As another example, while a menu item is continuously displayed along with screen information on a region adjacent to one of the corners of the display 170, when an input signal with respect to the menu item is received through the interface 140, the controller 150 may display the menu item in another shape.

Similarly, the controller 150 may display the menu item by changing one of size and position of the menu item. Also, the controller 150 may display a pop-up window including the menu item.

As described above, with rounding the corners of the bezel and the display 170, a design of an appearance of the image display apparatus 100 may be improved. Also, the menu item displayed on the rounded region of the display 170 may be displayed in another form or shape (for example, different size), thereby enhancing user convenience in view of selecting the menu item.

Figure 6:
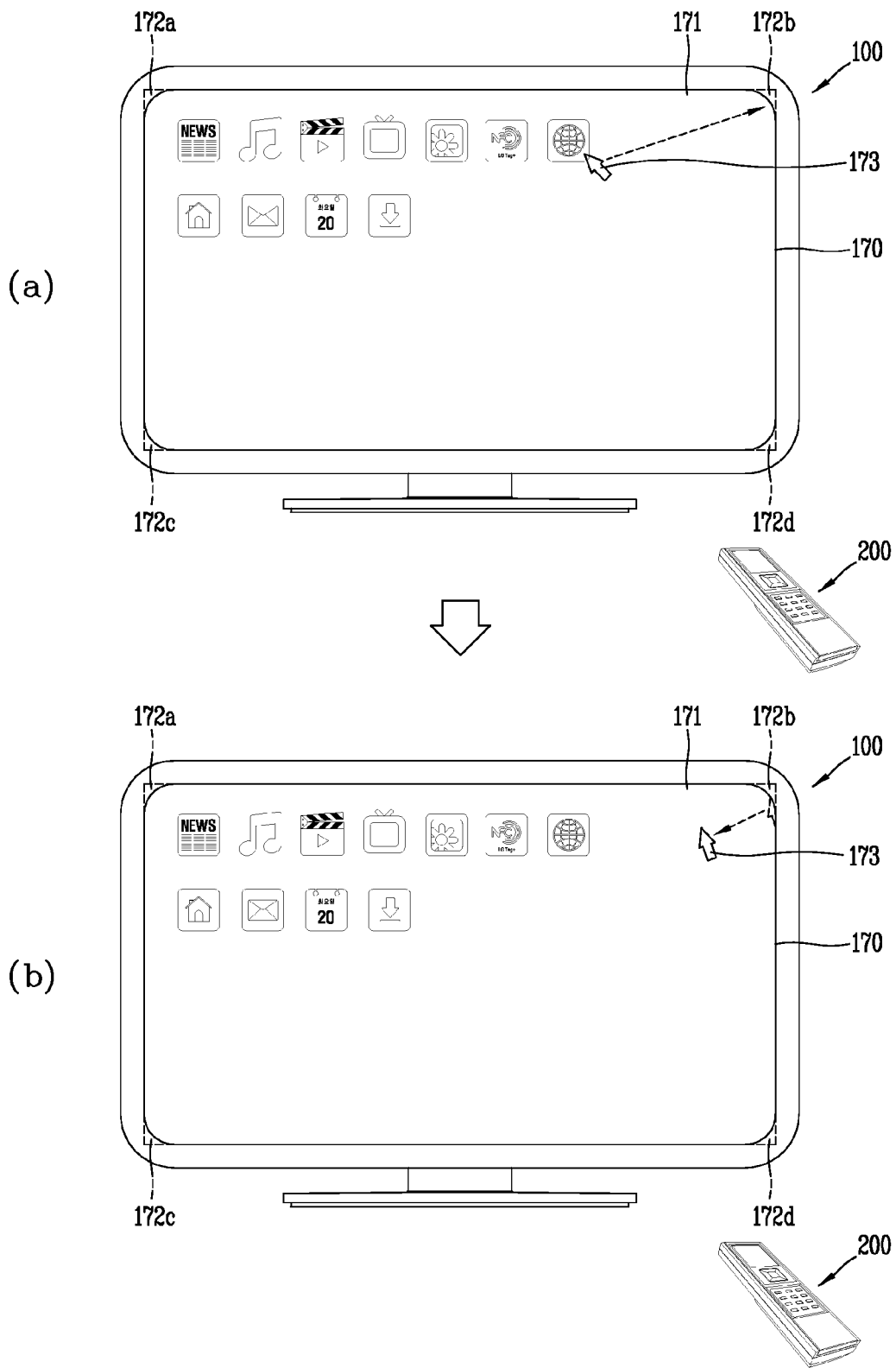
FIG. 6 is a conceptual view illustrating an exemplary operation of displaying an object indicating a reception of an input signal on a point where the input signal has been received.

FIG. 6 is a conceptual view illustrating an exemplary operation of displaying an object 173 indicating a reception of an input signal on a point where the input signal has been received.

The external input device 200 may transmit or receive signals to or from the image display apparatus 100 according to an RF communication standard. The external input device 200 may include a plurality of buttons and generate an external input signal in response to a user's button manipulation.

Referring to FIG. 6A, the display 170 of the image display apparatus 100 may display an object 173 according to an input signal of the external input device 200.

Here, when the input signal is received on a region adjacent to one of the corners of the display 170 through the interface 140, the controller 150, as illustrated in FIG. 6B, may output the object 173 on the input signal-received point (hereinafter, referred to as 'first point'). Here, at least part of the object 173 may be displayed on the first point.

Referring to FIG. 6B, to prevent non-displaying of the object 173 on the display 170, the controller 150 may display the object 173 to be located on another point adjacent to the first point (hereinafter, referred to as 'second point'). Here, a bounce-back effect of the object 173 may be generated.

Figure 9:
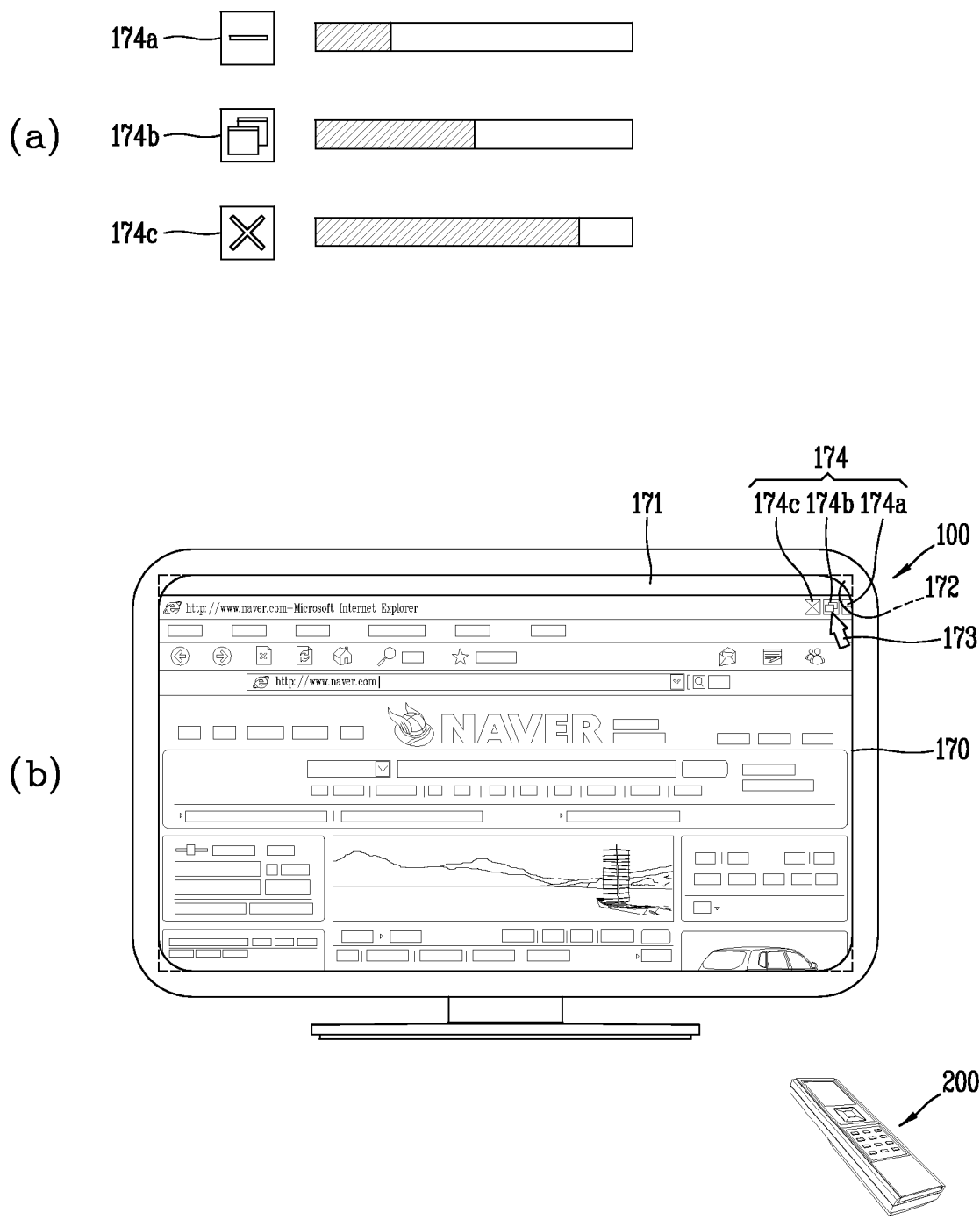

FIGS. 7 to 9 are conceptual views illustrating an exemplary operation of displaying a menu item 174 with its size enlarged.

As illustrated in (A) of FIG. 7A, corners of the display 170 may be rounded. The display 170 may include a pixel region 171 where pixels are arranged and a non-pixel region 172 where pixels are not arranged based on the rounded portions.

A webpage may be displayed as screen information on the pixel region 171 of the display 170.

A menu item 174 for controlling the webpage may be displayed along with the webpage. As illustrated, the menu item 174 may include icons corresponding to a function of minimizing a display webpage, a function of restoring a size of a webpage and a function of closing a webpage, respectively.

Here, when an input signal is received on the menu item 174 through the interface 140, the controller 150, as illustrated in (B) of FIG. 7A, may display the menu item 174 into another shape. For example, the controller 150 may display the menu item 174 by enlarging a size of the menu item 174.

Accordingly, at least part of the menu item 174, which has not been displayed due to the display 170 being rounded, may be displayed in the enlarged state, which may facilitate the user to select the menu item 174.

Referring to FIG. 7B, the controller 150 may display the menu item 174 for controlling the screen information on the display 170. However, when the menu item 174 is displayed on a region adjacent to a corner of the display 170, at least part of the menu item 174 may not be displayed due to the rounded corner of the display 170.

In detail, referring to (A) of FIG. 7B, an icon 174c, which corresponds to a function of closing a webpage (hereinafter, referred to as 'close icon'), of the menu item 174, may have been fully displayed if the corner of the display 170 were not rounded. However, the icon may be partially displayed due to the rounded corner of the display 170.

Referring to (B) of FIG. 7B, the controller 150 may display the close icon 174c in a distorting manner. That is, the controller 150 may fully display the close icon 174c by changing the shape of the close icon 174c (for example, a dented shape). Although not shown, the controller 150 may change the size of the close icon 174c to fully display the close icon 174c.

Referring to FIGS. 8 and 9, the controller 150 may display the menu item 174 by enlarging a size of at least one of a plurality of icons 174a to 174c (hereinafter, referred to as 'first to third icons') included in the menu item 174.

In detail, referring to FIG. 8A, the storage unit 160 (see FIG. 2) may store attribute information related to each of the first to third icons 174a to 174c. Here, the attribute information related to each of the first to third icons 174a to 174c may include information relating to user's use pattern.

For example, as illustrated, the storage unit 160 may store information related to a frequency of use as the user's use pattern information with respect to each of the first to third icons 174a to 174c.

The storage unit 160 may upgrade the information on the frequency of use of each of the first to third icons 174a to 174c whenever each of the first to third icons 174a to 174c is selected. The upgrading of the information on the frequency of use may be carried out every time when each of the first to third icons 174a to 174c is selected, or only when an input signal for upgrading the attribute information is received through the interface 140.

Referring to FIG. 8B, the controller 150 may decide an icon, which is to be displayed by enlarging a size, using the attribute information on each of the first to third icons 174a to 174c. Accordingly, the controller 150 may display the third icons 174c which has the highest frequency of use by enlarging its size.

Similarly, referring to FIG. 9A, the storage unit 160 may store attribute information related to each of the first to third icons 174a to 174c.

Referring to FIG. 9B, the controller 150 may decide an arrangement order of the first to third icons 174a to 174c of the menu item 174 using the attribute information on each of the first to third icons 174a to 174c. Accordingly, the controller 150 may arrange the first to third icons 174a to 174c in the order of higher frequency of use.

FIG. 10 is a conceptual view illustrating an exemplary operation of restoring the size of the menu item after a preset time lapses.

As illustrated in FIG. 10A, when an input signal is received on the menu item 174 through the interface 140, which is output on a region adjacent to one of corners of the display 170, then the controller 150 may display the menu item 174 by enlarging its size.

Referring to FIG. 10B, after a preset time lapses, the controller 150 may restore the enlarged size of the menu item 174.

Although not shown, when the input signal is received through the interface 140 on a point, which is away from the size-enlarged menu item 174 by more than a preset distance, the controller 150 may restore the enlarged size of the menu item 174.

Although not shown, when the enlarged menu item 174 is selected, the controller 150 may also control screen information based on the selected menu item 174 and restore the enlarged size of the menu item 174.

FIGS. 11 and 12 are conceptual views illustrating an exemplary operation of displaying a pop-up window 175 including the menu item 174.

As illustrated in FIG. 11A, the display 170 may display a webpage as screen information. The display 170 may also display the menu item 174 for controlling the webpage, along with the webpage. As illustrated, the menu item 174 may be output on a region adjacent to one of corners of the display 170.

Here, when an input signal is received on the menu item 174 through the interface 140, referring to FIG. 11B, the controller 150 may display the menu item 174 in another shape. For example, the controller 150 may display a pop-up window 175 including the menu item 174. Here, the pop-up window 175 may be displayed on a region adjacent to the menu item 174.

Although not shown, when a preset time lapses after the pop-up window 175 is displayed, the controller 150 may control the pop-up window 175 to disappear from the display 170. Also, when the input signal is received through the interface 140 on the pop-up window 175 or a point which is away from the menu item 174 by more than a preset distance, the controller 150 may control the pop-up window 175 to disappear from the display 170.

Although not shown, when one of the icons displayed on the pop-up window 175 is selected, the controller 150 may execute a function corresponding to the selected icon, and control the pop-up window 175 to disappear from the display 170. On the other hand, the controller 150 may also continuously display the pop-up window 175 even though a function corresponding to the selected icon is executed.

Referring to FIG. 12A, the display 170 of the image display apparatus 100 may display the object 173 in response to the input signal of the external input device 200. Also, the display 170 may display the pop-up window 175 corresponding to the menu item 174 on the first point.

Here, when the input signal is received on the second point, other than the first point, through the interface 140 (for example, dragged from the first point to the second point or sensed on the second point), then the controller 150 may move the position of the pop-up window 175 from the first point to the second point.

The foregoing embodiments have illustrated that the pop-up window 175 is displayed with overlapping the screen information in an opaque form. Transparency of the pop-up window 175 may be adjustable. For example, the controller 150 may adjust the transparency of the pop-up window 175 based on the input signal received through the interface 140.

Figure 13:
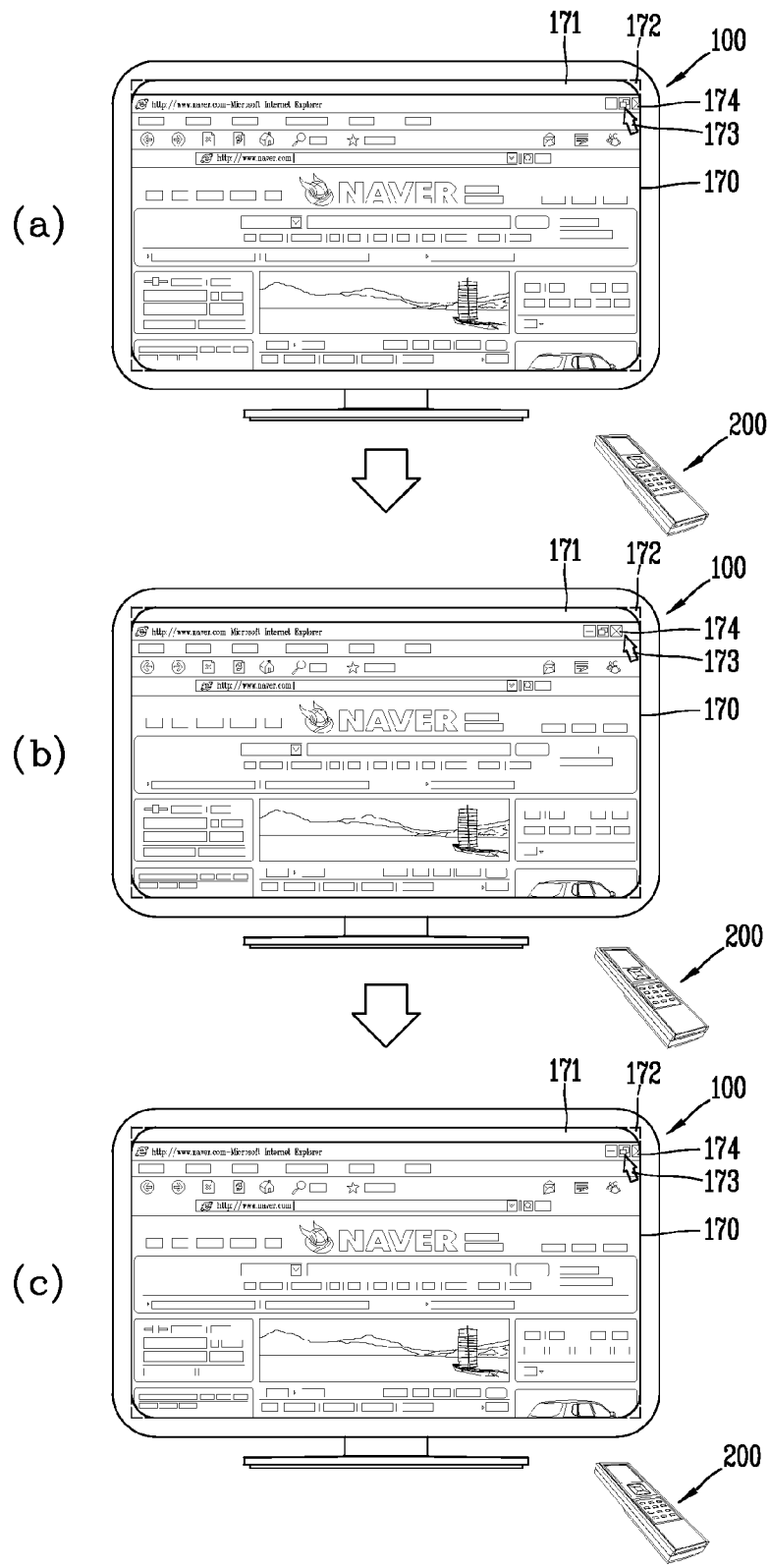
FIG. 13 is a conceptual view illustrating an exemplary operation of shifting (moving, changing) a position of the menu item for a preset time.

FIG. 13 is a conceptual view illustrating an exemplary operation of shifting (moving, changing) a position of the menu item 174 for a preset time.

As illustrated in FIG. 13A, the display 170 may display the menu item 174 for controlling a webpage, along with the webpage. The menu item 174 may be output on a region adjacent to one of the corners of the display 170.

Here, when an input signal is received on the menu item 174 through the interface 140, the controller 150 may display the menu item 174 in another shape.

For example, when an input signal with respect to the first point where the menu item is displayed is sensed, as illustrated in FIG. 13B, the controller 150 may move the position of the menu item 174 to the second point, adjacent to the first point, for a preset time.

After the preset time lapses, as illustrated in FIG. 13C, the controller 150 may restore the position of the menu item 174 to the first point. Here, since such operation is carried out within a short time, a bounce-back effect of the object 173 may be generated.

Figure 14:
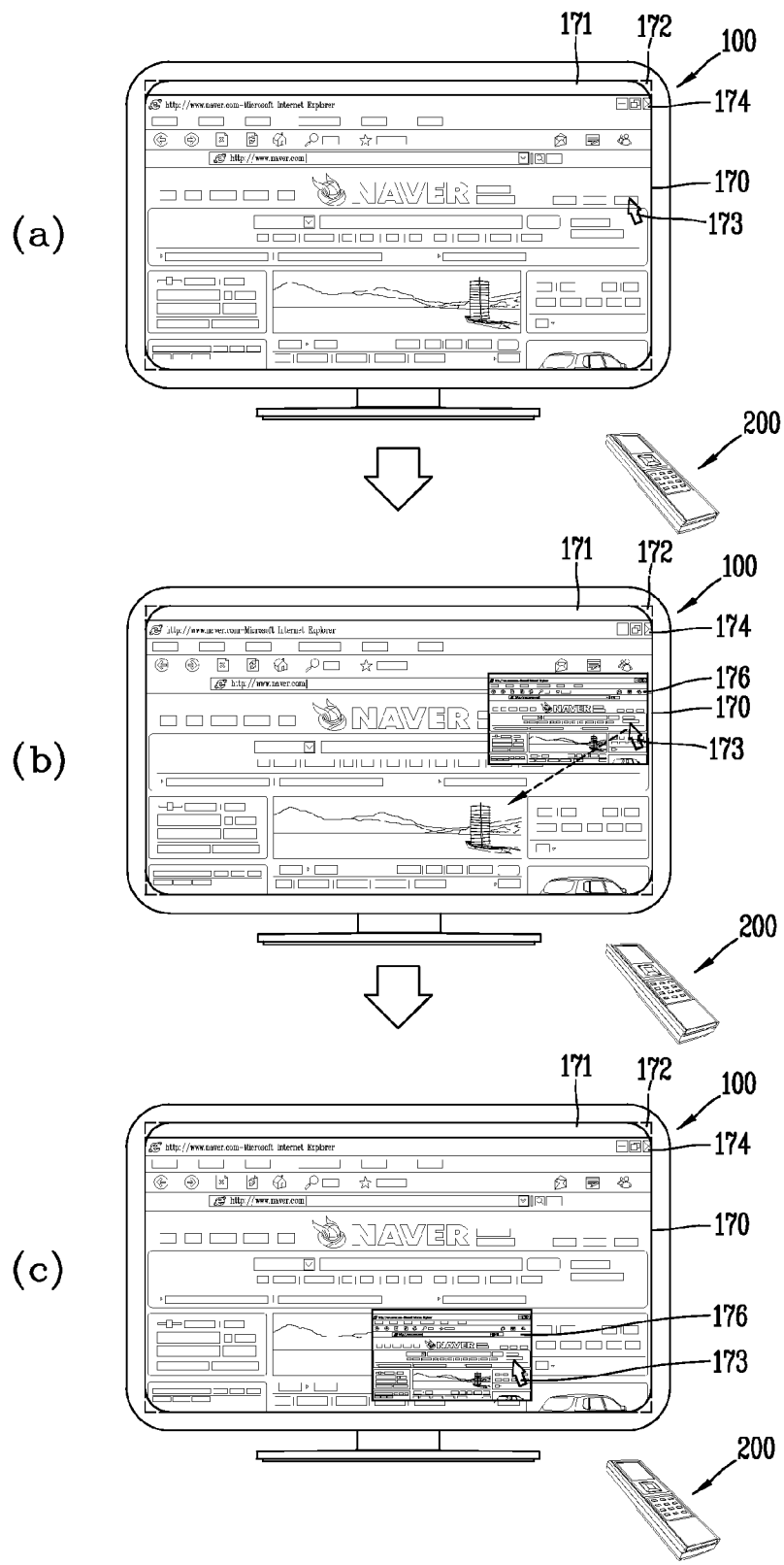
FIGS. 14 and 15 are conceptual views illustrating an exemplary operation of displaying a thumbnail image for screen information.
Figure 15:
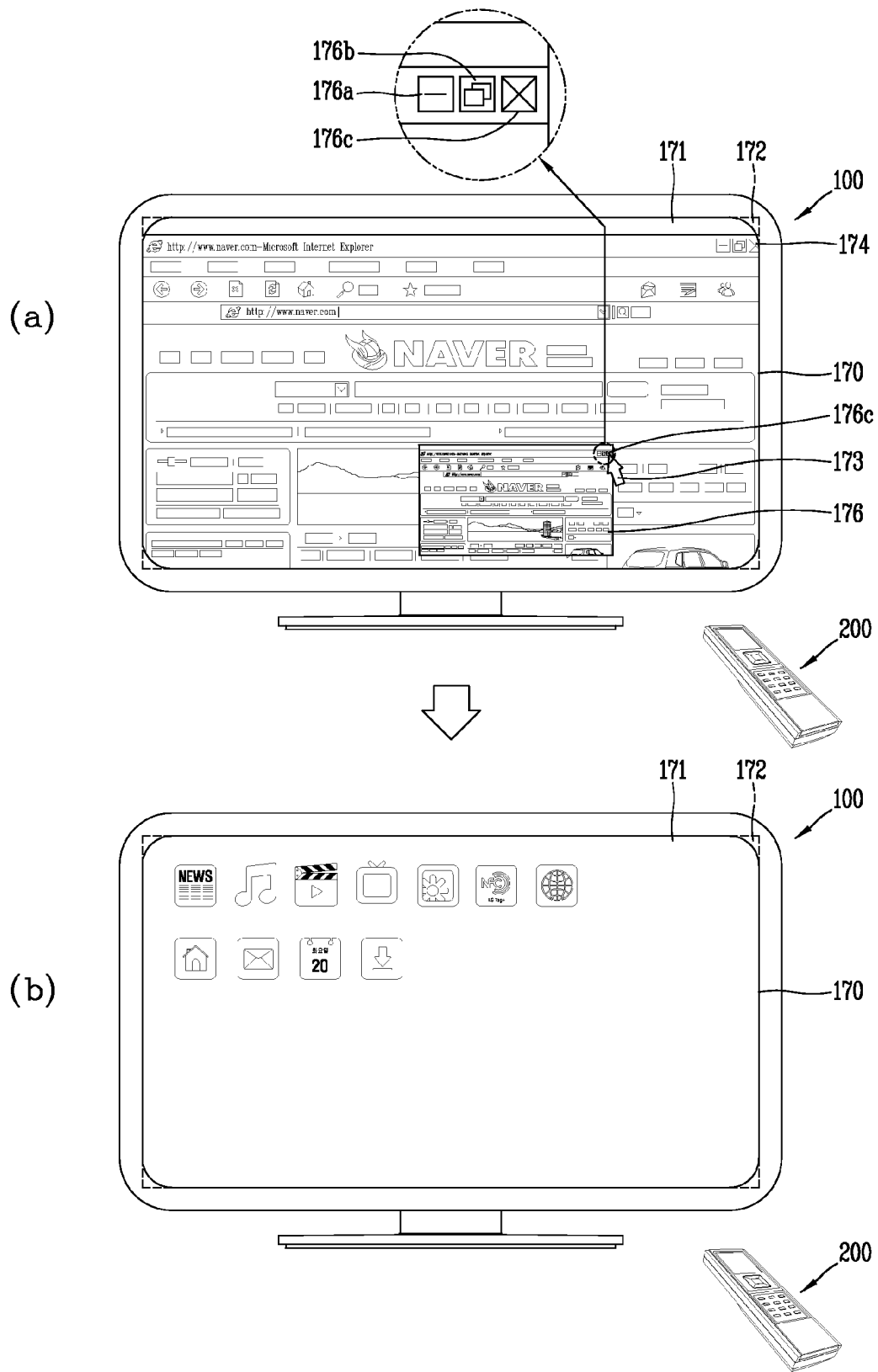

FIGS. 14 and 15 are conceptual views illustrating an exemplary operation of displaying a thumbnail image 176 for screen information.

As illustrated in FIG. 14A, the display 170 may display a webpage as screen information.

Here, when a preset input signal is received through the interface 140, as illustrated in FIG. 14B, the controller 150 may display a thumbnail image 176 for the screen information (for example, the webpage) output on the display 170 on one region (for example, on the first point) of the display 170.

Meanwhile, when another input signal is newly received on the second point, other than the first point, through the interface 140(for example, dragged from the first point to the second point or sensed on the second point), as illustrated in FIG. 14C, then the controller 150 may move the position of the thumbnail image 176 from the first point to the second point.

Referring to FIG. 15A, the thumbnail image 176 is a reduced image of the screen information, and may include icons 176*a* to 176*c* corresponding to the menu item 174 displayed on the screen information.

Here, one (for example, a close icon) 176*c* of the icons 176*a* to 176*c* may be selected based on the input signal received through the interface 140.

Here, referring to FIG. 15B, the controller 150 may control the screen information based on the selected icon 176*c*. Accordingly, the controller 150 may control the webpage displayed to disappear from the display 170, and output a home screen on the display 170.

Figure 16:
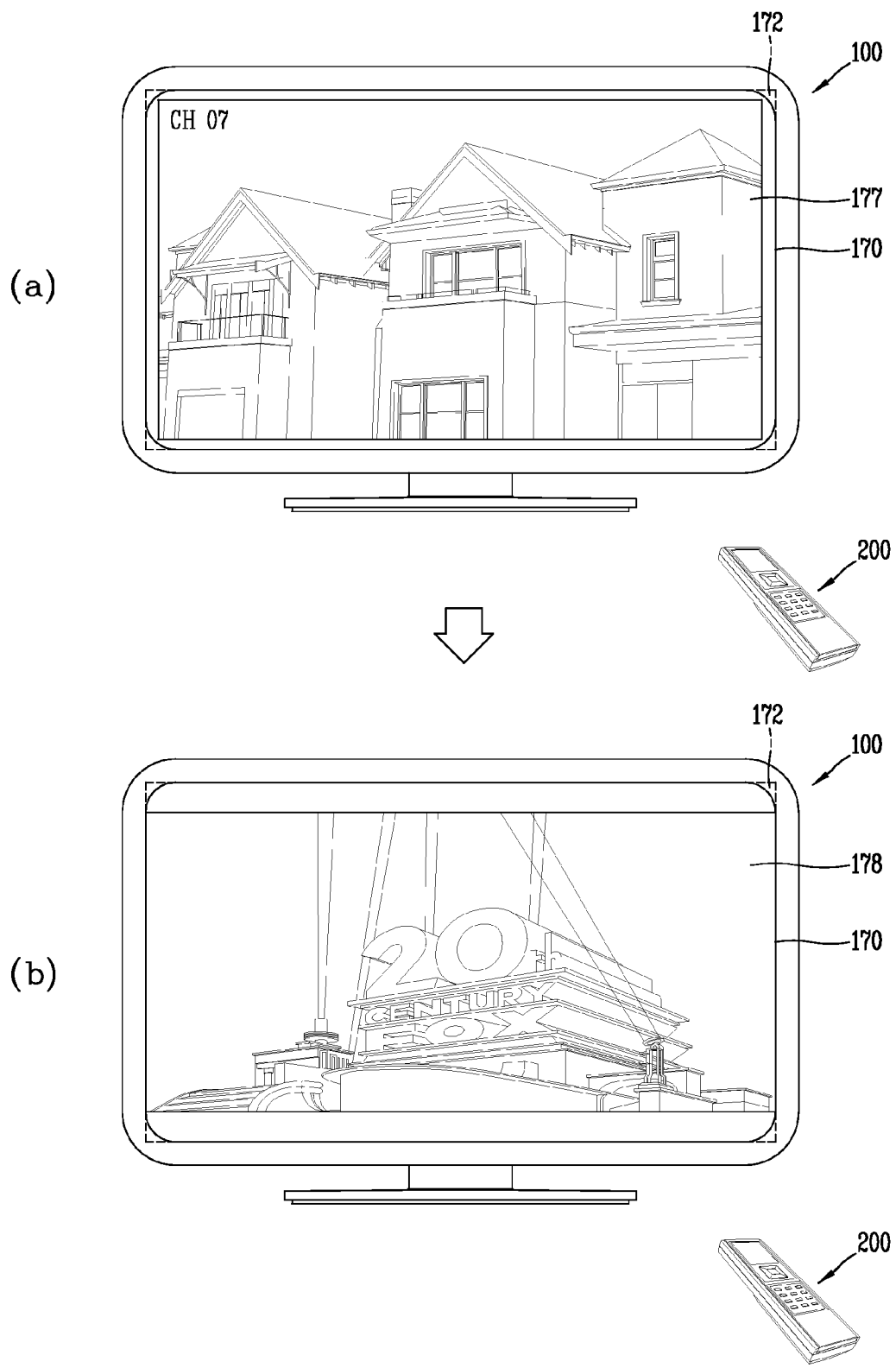

FIGS. 16 and 17 are conceptual views illustrating an exemplary operation of deciding a scaling ratio of screen information.

The controller 150 may decide a scaling ratio of screen information based on at least one of attribute information on screen information displayed on the display 170 and information on a user's use pattern.

For example, the controller 150 may detect type information related to the screen information displayed on the display 170. Here, the screen information may include at least one of a TV image, a video, a photo, a text document, a webpage, and an application execution screen. The controller 150 may compare resolution of each of the screen information with resolution of the display 170. The controller 150 may decide a scaling ratio of the screen information based on the resolution comparison result.

Referring to FIG. 16A, the display 170 may display a TV image 177. Here, the controller 150 may stop displaying the TV image 177 and then display a video 178, based on an input signal received through the interface 140. Here, the controller 150 may decide the scaling ratio of the video 178 based on resolution of the video 178. Accordingly, referring to FIG. 16B, the video 178 may be played by horizontally extending rather than the TV image 177.

Referring to FIG. 17A, the display 170 may display the TV image 177. Here, the controller 150 may stop displaying the TV image 177 and then display a webpage 179 based on an input signal received through the interface 140. Here, the controller 150 may decide a scaling ratio of the webpage 179 based on resolution of the webpage 179. Accordingly, referring to FIG. 17B, the webpage 179 may be displayed by vertically extending rather than the TV image.

Although not shown, the controller 150 may decide the scaling ratio of the screen information based on the information on the user's use pattern, as well as the attribute information on the screen information. For example, the controller 150 may scale the screen information based on information related to the user's frequency of use involved with the scaling ratio.

As described above, screen information may be displayed on the display 170 based on resolution which is optimized for the screen information, which may allow the user to view the screen information without feeling irritated.

Figure 18:
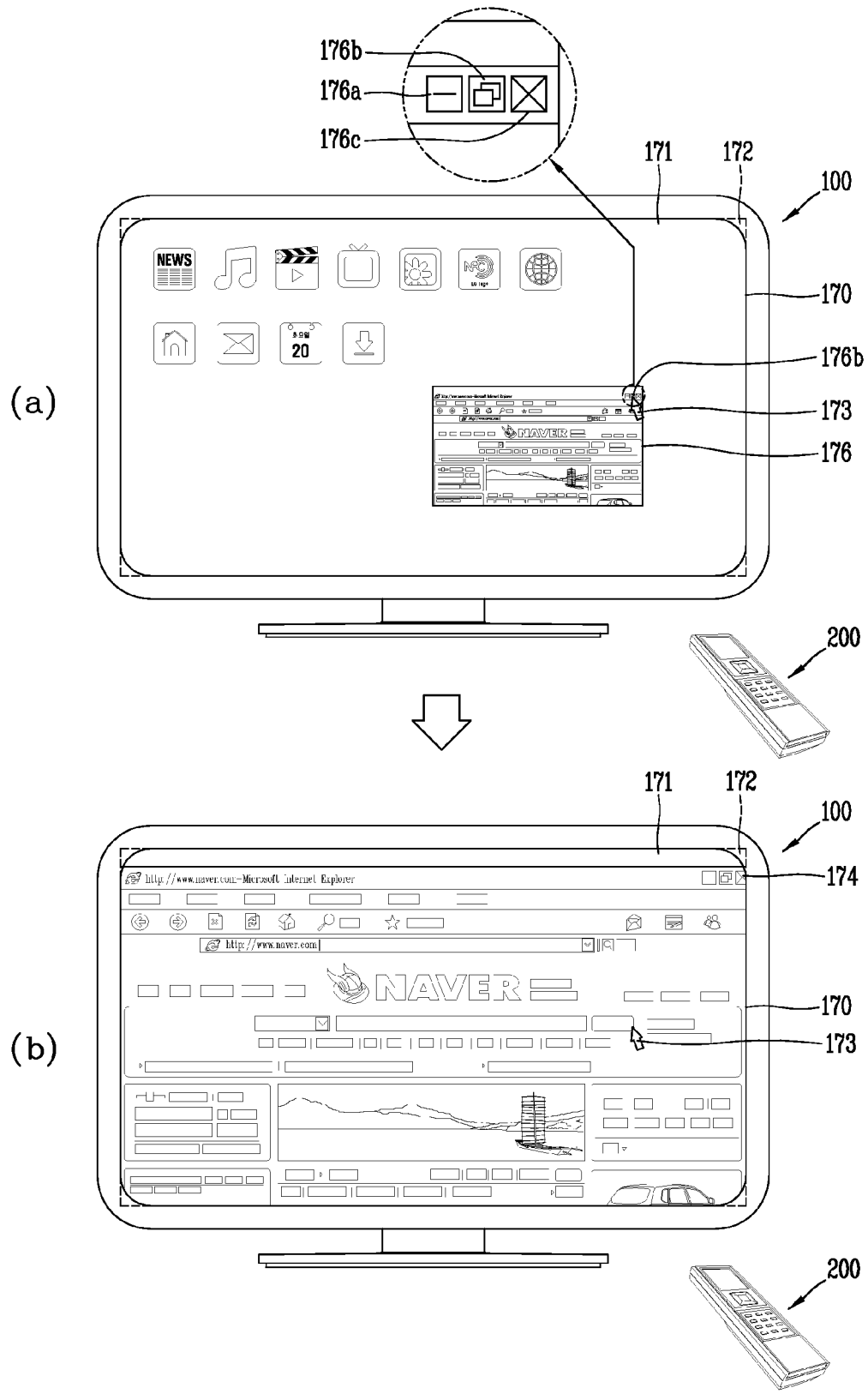
FIGS. 18 and 19 are conceptual views illustrating an exemplary operation of deciding a scaling ratio when an application is executed on an entire screen.
Figure 19:
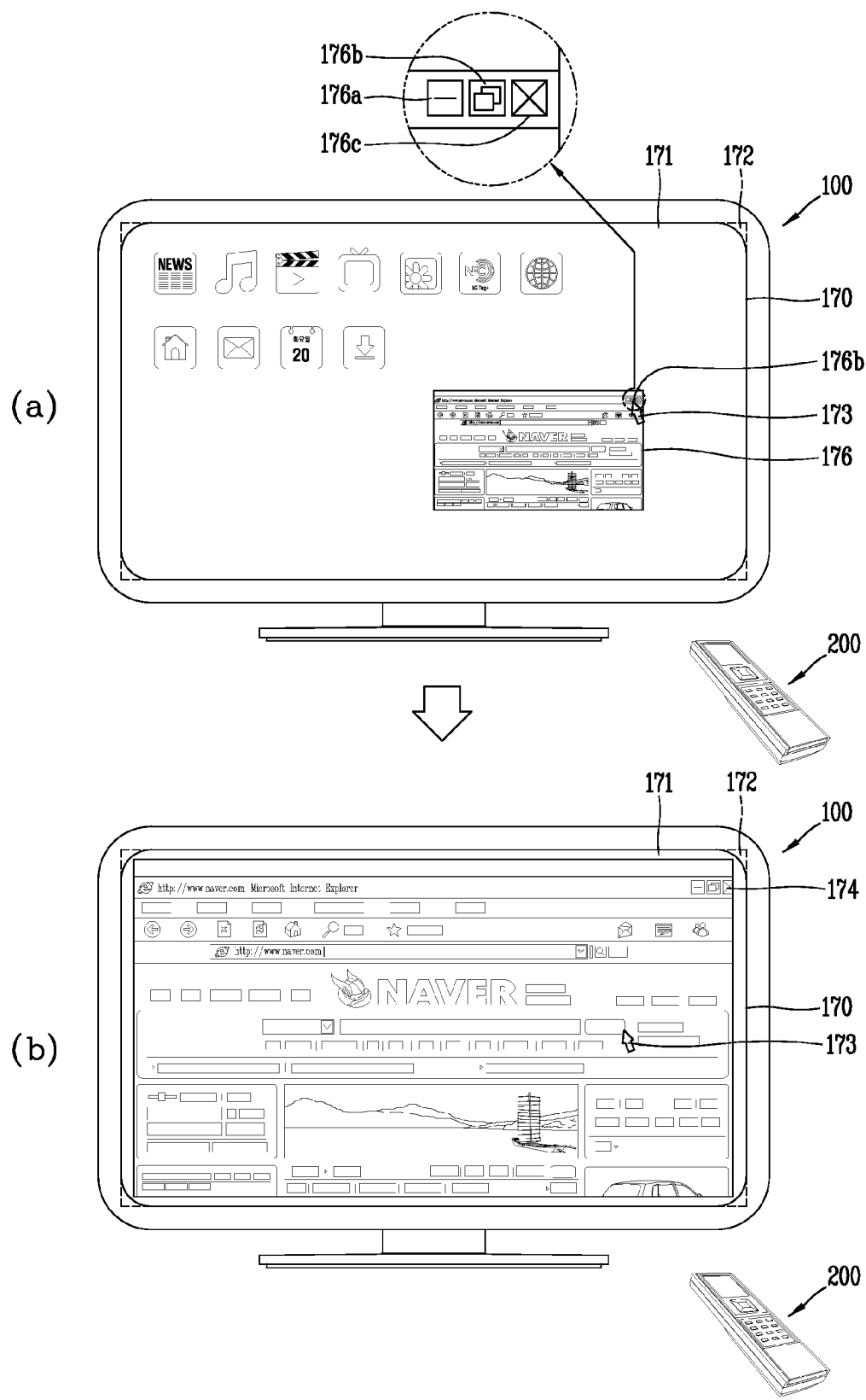

FIGS. 18 and 19 are conceptual views illustrating an exemplary operation of deciding a scale ratio when an application is executed on an entire screen.

As illustrated in FIGS. 18A and 19A, the display 170 may display screen information. The display 170 may display a home screen and then display a pop-up window 176 including the webpage on the home screen. The pop-up window 176 may include icons 176*a* to 176*c* (see FIG. 18B and FIG. 19B) corresponding to the menu item 174.

Here, one (for example, a full-screen display icon) 176*c* of the icons 176*a* to 176*c* may be selected based on an input signal received through the interface 140.

The controller 150 may display the webpage using an entire screen based on the selected full-screen display icon 176*c*. Here, the controller 150 may decide a scaling ratio of the webpage.

In detail, the controller 150 may decide the scaling ratio of the webpage based on setting information. For example, the controller 150 may decide the scaling ratio of the webpage based on setting information preset by the user or setting information according to determination of the controller 150.

The controller 150 may decide the scaling ratio of the webpage based on a user selection. For example, the controller 150 may decide the scaling ratio of the webpage based on an input signal transmitted by the user through the external input device 200.

Accordingly, referring to FIG. 18B, the controller 150 may display the webpage by horizontally extending the webpage. Meanwhile, referring to FIG. 19B, the controller 150 may control an entire region of the webpage to be displayed on the display 170 without extending the webpage horizontally or vertically. Although not shown, the controller 150 may display the webpage by extending vertically the webpage.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus comprising:
a display having rounded corners and including a pixel region arranged on an inner region of the rounded corners and a non-pixel region arranged on an external region of the rounded corners, wherein the display is configured to display a portion of a menu item having a first shape adjacent to one of the corners of the display for controlling screen information;
an interface configured to receive an input signal with respect to the display; and
a controller configured to:
determine a second shape for the menu item when the input signal is input to the menu item, wherein the second shape for the menu item enlarges at least a portion of the first shape; and
display the menu item having the second shape on the pixel region.

2. The apparatus of claim 1, wherein when the input signal is received, the display is configured to display an object on an input signal-received point of the display, the object indicating the reception of the input signal.

3. The apparatus of claim 1, wherein the controller restores the menu item to the first shape when a preset time lapses.

4. The apparatus of claim 1, wherein when the menu item is selected, the controller controls the screen information based on the selected menu item and restores the menu item to the first shape.

5. The apparatus of claim 1, wherein when the input signal is received on the region adjacent to one of the corners of the display, the controller changes the menu item to the second shape by enlarging a size of the menu item.

6. The apparatus of claim 5, wherein the menu item comprises a plurality of icons, and
wherein the controller displays at least one of the plurality of icons by enlarging a size of the at least one icon.

7. The apparatus of claim 6, wherein the controller is configured to select the at least one icon to be displayed by extending the size based on information related to a user's use pattern.

8. The apparatus of claim 1, wherein when the input signal is received on a region adjacent to the one of the corners of the display, the controller displays a pop-up window including the menu item.

9. The apparatus of claim 8, wherein the controller moves a position of the pop-up window based on an input signal received on the pop-up window.

10. The apparatus of claim 1, wherein when the input signal is received on a region adjacent to the one of the corners of the display, the controller displays the menu item on the input signal-received point, and
wherein the controller moves a position of the menu item to another position, adjacent to the input signal-received point, for a preset time, and then restores the position of the menu item after the preset time lapses.

11. The apparatus of claim 1, wherein when a preset input signal is received, the controller displays a thumbnail image for the screen information, displayed on the display, on one region of the display.

12. The apparatus of claim 11, wherein the controller controls the screen information displayed on the display based on an input signal received on the thumbnail image.

13. The apparatus of claim 11, wherein the controller is configured to change a position of the thumbnail image based on an input signal received on the thumbnail image.

14. The apparatus of claim 1, wherein the controller decides a scaling ratio of the screen information based on at least one of attribute information related to the screen information displayed on the display and information related to a user's use pattern.

15. A method for controlling an image display apparatus including a display, the display having rounded corners and including a pixel region arranged on an inner region of the rounded corners and a non-pixel region arranged on an external region of the rounded corners, the method comprising:
displaying screen information on the inner region of the rounded corners of the display;
displaying a menu item having a first shape adjacent to one of the rounded corners of the display, wherein the menu item controls the screen information;
receiving an input signal with respect to the display;
deciding a second shape for the menu item when the input signal is input to the menu item, wherein the second shape for the menu item enlarges at least a portion of the first shape; and
displaying the menu item having the second shape on the pixel region.

16. The method of claim 15, further comprising displaying an object on an input signal-received point of the display, the object indicating the reception of the input signal, when the input signal is received.

17. The apparatus of claim 1, wherein the first shape for the menu item is a sub-portion of the second shape for the menu item.

18. The method of claim 15, wherein the first shape for the menu item is a sub-portion of the second shape for the menu item.

* * * * *